US012360850B2

(12) United States Patent
Gupta et al.

(10) Patent No.: US 12,360,850 B2
(45) Date of Patent: Jul. 15, 2025

(54) SYSTEM RECOVERY DURING CGI-WL DEFECT

(71) Applicant: Western Digital Technologies, Inc., San Jose, CA (US)

(72) Inventors: Mahim Raj Gupta, San Jose, CA (US); Ramkumar Subramanian, Pleasanton, CA (US); Piyush Girish Sagdeo, Santa Clara, CA (US); Lior Avital, Kfar Saba (IL)

(73) Assignee: Sandisk Technologies, Inc., Milpitas, CA (US)

( * ) Notice: Subject to any disclaimer, the term of this patent is extended or adjusted under 35 U.S.C. 154(b) by 234 days.

(21) Appl. No.: 18/349,093

(22) Filed: Jul. 7, 2023

(65) Prior Publication Data

US 2024/0176705 A1      May 30, 2024

Related U.S. Application Data

(60) Provisional application No. 63/385,318, filed on Nov. 29, 2022.

(51) Int. Cl.
     *G06F 11/14*      (2006.01)
(52) U.S. Cl.
     CPC ................ *G06F 11/1446* (2013.01)
(58) Field of Classification Search
     CPC .................................. G06F 11/1446
     USPC ....................................... 365/200
     See application file for complete search history.

(56) References Cited

U.S. PATENT DOCUMENTS

| | | | |
|---|---|---|---|
| 8,902,657 B2 | 12/2014 | Iwai et al. | |
| 9,330,783 B1 | 5/2016 | Rotbard et al. | |
| 10,032,524 B2 | 7/2018 | Sabde et al. | |
| 10,229,751 B2 | 3/2019 | Avraham et al. | |
| 2010/0172179 A1* | 7/2010 | Gorobets | G06F 12/0246 365/185.11 |
| 2020/0327953 A1 | 10/2020 | Fleming et al. | |
| 2021/0366549 A1* | 11/2021 | Dutta | G06F 3/0616 |
| 2022/0121391 A1* | 4/2022 | Siripragada | G06F 3/064 |
| 2022/0270703 A1* | 8/2022 | Chandramani | G11C 11/5671 |

* cited by examiner

*Primary Examiner* — Ly D Pham
(74) *Attorney, Agent, or Firm* — ARENTFOX SCHIFF LLP

(57) ABSTRACT

Aspects of a storage device are provided for handling GBBs with defects between global interconnects and local word lines. The storage device includes a plurality of blocks each including a plurality of word lines, a plurality of interconnects within an interconnect set and between multiple ones of the blocks, volatile memory, and a controller. The controller determines a logical address pattern associated with the multiple ones of the blocks respectively including a program failure, determines whether the logical address pattern is associated with the interconnect set for the multiple ones of the blocks, determines a common word line associated with the program failures in the multiple ones of the blocks, un-marks these blocks as GBBs, and refrains from programming the common word line during respective program operations in the multiple ones of the blocks. Thus, blocks may be reclaimed, defective word line(s) isolated, and likelihood of read-only modes reduced.

20 Claims, 16 Drawing Sheets

| CGI-SET-1 | CGI-SET-2 | CGI-SET-1 | CGI-SET-3 | CGI-SET-4 | CGI-SET-3 |
|---|---|---|---|---|---|
| 1020 | 1022 | 1024 | 1026 | 1028 | 102A | 102C | 102E |
| 2020 | 2022 | 2024 | 2026 | 2028 | 202A | 202C | 202E |
| 3020 | 3022 | 3024 | 3026 | 3028 | 302A | 302C | 302E |
| ⋮ | | | | | | | |
| ⋮ | | | | | | | |

FIG. 11

| Address | Type | Error Cause |
|---|---|---|
| fim0x02,chip0x00,die0x02,plane0x00,block0x000A | GROWN_BAD_BLOCK | PS_BBM_BAD_BLOCK_ERROR_CAUSE_PROG |
| fim0x02,chip0x00,die0x02,plane0x00,block0x000C | GROWN_BAD_BLOCK | PS_BBM_BAD_BLOCK_ERROR_CAUSE_PROG |
| fim0x02,chip0x00,die0x02,plane0x00,block0x001A | GROWN_BAD_BLOCK | PS_BBM_BAD_BLOCK_ERROR_CAUSE_PROG |
| fim0x02,chip0x00,die0x02,plane0x00,block0x001C | GROWN_BAD_BLOCK | PS_BBM_BAD_BLOCK_ERROR_CAUSE_PROG |
| fim0x02,chip0x00,die0x02,plane0x00,block0x002A | GROWN_BAD_BLOCK | PS_BBM_BAD_BLOCK_ERROR_CAUSE_PROG |
| fim0x02,chip0x00,die0x02,plane0x00,block0x002C | GROWN_BAD_BLOCK | PS_BBM_BAD_BLOCK_ERROR_CAUSE_PROG |
| fim0x02,chip0x00,die0x02,plane0x00,block0x0247 | GROWN_BAD_BLOCK | PS_BBM_BAD_BLOCK_ERROR_CAUSE_PROG |
| fim0x02,chip0x00,die0x02,plane0x00,block0x0FFC | GROWN_BAD_BLOCK | PS_BBM_BAD_BLOCK_ERROR_CAUSE_PROG |

FIG. 12

SYSTEM RECOVERY DURING CGI-WL DEFECT

CROSS REFERENCE TO RELATED APPLICATION(S)

This application claims the benefit of U.S. Provisional Application No. 63/385,318, entitled "SYSTEM RECOVERY DURING CGI-WL DEFECT" and filed on Nov. 29, 2022, the disclosure of which is expressly incorporated by reference herein in its entirety.

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

When reading or writing data in the flash memory, the flash storage device may identify the physical address of the block associated with the logical address in which the data is stored. The flash storage device may then read or write the data in the block at the identified physical address. The flash storage device may also erase data in the block prior to writing new data in the block. However, if there is a physical defect or other problem with the block during a read, program, or erase operation, a read failure, a program failure, or an erase failure may respectively occur. When such failure(s) occur, the flash storage device may mark the block as a grown bad block (GBB), and may logically or virtually remove the block from the population of accessible blocks. If too many GBBs are marked, the flash storage device may enter a read only mode, significantly reducing the performance of the storage device.

SUMMARY

One aspect of a storage device is disclosed herein. The storage device includes a plurality of blocks of non-volatile memory each including a plurality of word lines, a plurality of interconnects between multiple ones of the blocks and within an interconnect set, volatile memory, and a controller. The controller is configured to determine a word line from the plurality of word lines that is associated with a program failure, where the word line is a common word line associated with program failures in the multiple ones of the blocks. The controller is also configured to store, in the volatile memory, a logical identifier of the common word line and logical addresses of the multiple ones of the blocks in response to the determination. The controller is further configured to program multiple word lines of the plurality of word lines respectively in the blocks associated with the logical addresses. The multiple word lines exclude at least the word line associated with the stored logical identifier.

Another aspect of a storage device is disclosed herein. The storage device includes a plurality of blocks of non-volatile memory each including a plurality of word lines, a plurality of interconnects between multiple ones of the blocks and within an interconnect set, and a controller. The controller is configured to determine a logical address pattern associated with the multiple ones of the blocks, where the multiple ones of the blocks respectively include a program failure. The controller is further configured to determine whether the logical address pattern is associated with the interconnect set for the multiple ones of the blocks, and to determine, in response to the logical address pattern being associated with the interconnect set, a word line from the plurality of word lines that is associated with the program failures. The word line is a common word line associated with the program failures in the multiple ones of the blocks. The controller is further configured to refrain from programming the common word line during respective program operations in the multiple ones of the blocks.

A further aspect of a storage device is disclosed herein. The storage device includes a plurality of blocks of non-volatile memory each including a plurality of word lines, a plurality of interconnects between multiple ones of the blocks and within an interconnect set, a first register including a first set of bits corresponding to the plurality of interconnects, a second register including a second set of bits corresponding to the plurality of word lines, and a controller. The controller is configured to determine the interconnect set associated with program failures in the multiple ones of the blocks, and to determine, in response to the determination of the interconnect set, a word line from the plurality of word lines that is associated with the program failures. The word line is a common word line to the multiple ones of the blocks. The controller is further configured to provide a command to program the plurality of word lines respectively in at least one of the multiple ones of the blocks, where the common word line is excluded from programming in response to a value of the first register and a value of the second register.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIG. 11 is a conceptual diagram illustrating an example of a mapping table that associates CGI sets to block addresses in the storage device of FIG. 1.

FIG. 12 is a conceptual diagram illustrating an example of a bad block table that includes the addresses of GBBs that experienced program failures in the storage device of FIG. 1.

DETAILED DESCRIPTION

Figure 1:
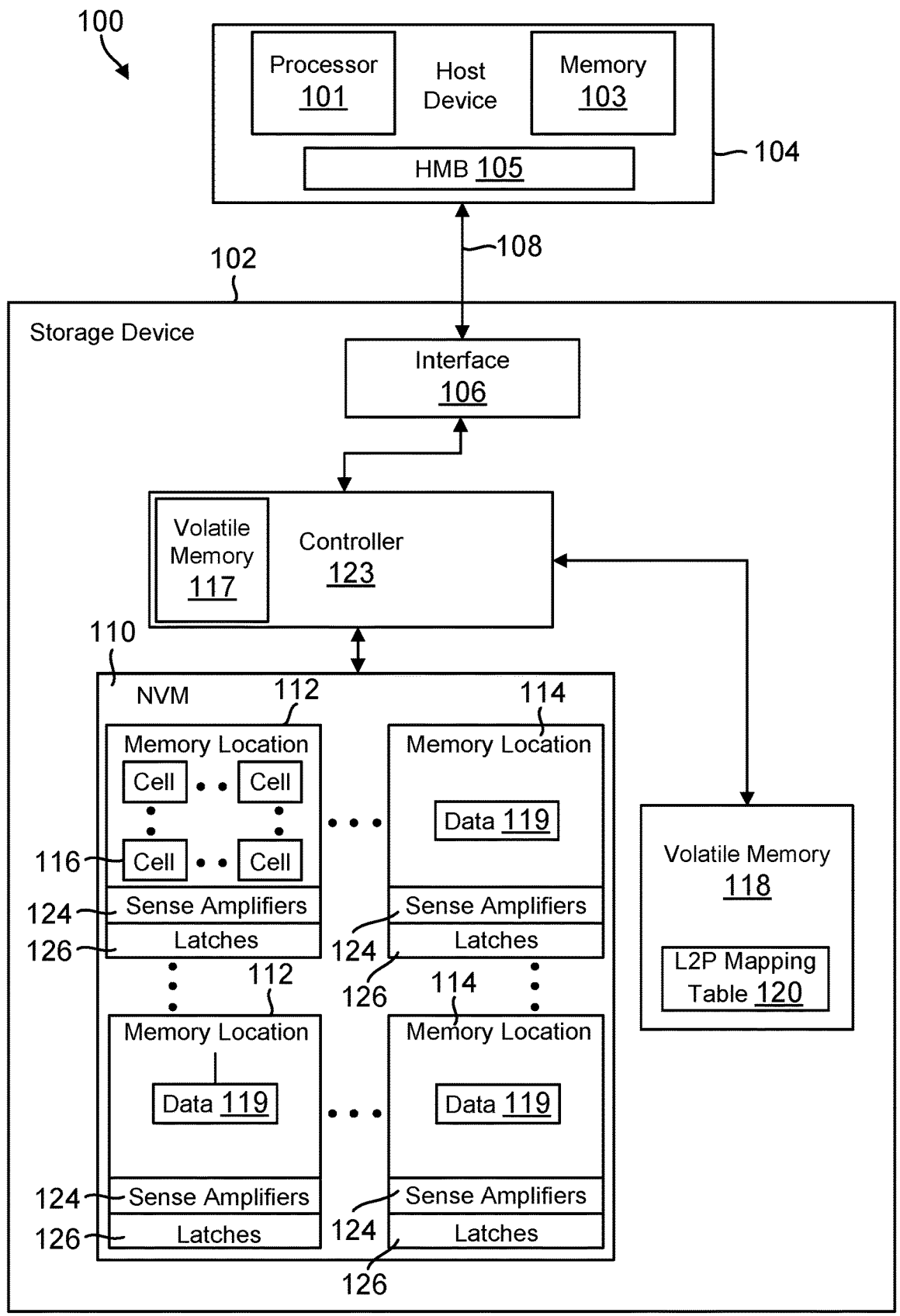
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When a storage device writes data into memory, the storage device attempts to program the data into various memory cells on a word line. The storage device may attempt to program the data by applying a voltage to the word line over a given number of cycles or loops, such as incremental-step-pulse programming (ISPP) cycles, until electrons tunnel into charge trapping layers of selected memory cells. However, in many cases, the cells on the word line may not be successfully programmed within a predetermined time or loop count (e.g. a maximum number of ISPP cycles). When such program failure occurs for a word line, the storage device identifies a block including the word line as a grown bad block (GBB), and the storage device replaces that block with a free block from the population of blocks available for access in the storage device.

Yet, in some cases, a program failure may occur due to a short between a local word line and a global interconnect between multiple physical blocks respectively including the local word line. Such physical defect, referred to throughout this disclosure as a common global interconnect (CGI)-word line (WL) defect, may result in back-to-back program failures whenever the storage device attempts to program the local word line in any of these multiple physical blocks. As a result of these consecutive program failures, the storage device may identify numerous GBBs and perform numerous block replacements despite the CGI-WL defect itself (e.g., the short between the word line and the CGI) being present in only one or more word lines in one or more of these blocks. If the population of available blocks thus ends up decreasing to such an extent that no available blocks remain to replace subsequent GBBs, the storage device may enter a read-only mode, leading to significant reduction of performance.

Accordingly, aspects of the present disclosure allow a controller of the storage device to handle GBBs more efficiently in the event of a CGI-WL defect, or more generally in the event of a physical defect involving a global interconnect such as a CGI and a local interconnect such as a WL (referred to throughout this disclosure as a global-local line defect). Initially, the controller may maintain a mapping of blocks to CGI sets (or more generally, global interconnect sets). For example, CGIs may be grouped into multiple sets, where each CGI set includes a plurality of CGIs that are configured to drive voltages for NAND operations in the local word lines of various physical blocks, and the controller may store respective mappings of logical addresses of these various blocks to their corresponding CGI sets. The controller may map blocks with common logical block address (LBA) portions to a same CGI set. For example, the controller may map physical blocks that each have a LBA ending in '7' or 'F' to a same CGI set (e.g., blocks having LBAs 0x0007, 0x000F, 0x0017, 0x001F, etc.). During runtime of the storage device, consecutive program failures may occur respectively in multiple blocks, and the controller may mark these program failed blocks as GBBs. If the controller determines that a threshold quantity of GBBs has been marked (e.g., no available free blocks remain to replace subsequent GBBs), then rather than immediately causing the storage device to enter a read-only mode, the controller first determines whether a plurality of these GBBs are due to a CGI-WL defect (or other global-local line defect). For instance, the controller may refer to its mappings of blocks to CGI sets to determine whether the GBBs have a block address dependency on CGI set (e.g., whether multiple blocks have a LBA ending in '7' or 'F' in the aforementioned example). If not, the controller may determine that a CGI-WL defect (or other global-local line defect) does not exist, and therefore cause the storage device to enter the read-only mode as previously described.

Otherwise, if such block address dependency (and thus a CGI-WL defect or other global-local line defect) is determined to exist, the controller may un-mark these blocks as GBBs (e.g., re-allocate the blocks to the population of blocks available for access in the storage device), the controller may determine the logical identifier(s) of the word line(s) that had resulted in program failures in the blocks associated with the determined CGI set (or other global interconnect set), and the controller may refrain from programming these defective word line(s) in these blocks. For example, if the controller determines that WL 105 failed programming in LBAs 0x0007, 0x000F. 0x0017, 0x001F, etc. associated with a CGI set, the controller may add the logical identifier of this defective word line (word line address 105) to a table in volatile memory, referred to throughout this disclosure as an isolation table or a logical word line (LWL) isolation table, and the controller may exclude this word line address in subsequent program commands to the blocks associated with these LBAs. In another example, rather than adding the logical identifier of this word line (word line address 105) to an isolation table, the storage device may be configured with one or more hardware registers that control whether respective word lines are connected to their associated memory cells, and the controller may set these register(s) such that the defective word line is not programmed (e.g., not connected to its associated memory cells) when the controller programs a block in the associated CGI set. Thus, the controller may reclaim blocks that otherwise would have been classified as GBBs due to CGI-WL defects (or other global-local line defects), isolate the defective word line(s) in these blocks to prevent subsequent program failures due to CGI-WL defect(s) (or other global-local line defects) using firmware/software (e.g., an isolation table) and/or hardware (e.g., memory registers), and consequently reduce the likelihood of the storage device inefficiently entering a read-only mode.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/ laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host 104 may also include a host memory buffer (HMB 105). The HMB 105 is a portion of host memory (e.g., host memory 103 or a different memory in host 104) that the host 104 may allocate to the storage device 102 to utilize for the storage device's own purposes. For instance, the storage device 102 may utilize the HMB 105 as an address mapping table cache or a data cache. In some examples, the HMB 105 may include volatile memory, such as RAM, DRAM, or SDRAM (e.g., DDR1, DDR2, DDR3, DDR3L, LPDDR3, DDR4, and the like). In other examples, the HMB 105 may include non-volatile memory.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of NVM memory locations 112 which may store system data for operating the storage device 102 or user data received from the host for storage in the storage device 102. For example, the NVM may have a cross-point architecture including a 2-D NAND array of NVM memory locations 112 having n rows and m columns, where m and n are predefined according to the size of the NVM. In the exemplary embodiment of FIG. 1, each NVM memory location 112 may be a die 114 including multiple planes each including multiple blocks of multiple cells 116. Alternatively, each NVM memory location 112 may be a plane including multiple blocks of the cells 116. The cells 116 may be single-level cells, multi-level cells, triple-level cells, quad-level cells, and/or penta-level cells, for example. Other examples of NVM memory locations 112 are possible; for instance, each NVM memory location may be a block or group of blocks. Each NVM memory location may include one or more blocks in a 3-D NAND array. Each NVM memory location 112 may include one or more logical blocks which are mapped to one or more physical blocks. Alternatively, the memory and each NVM memory location may be implemented in other ways known to those skilled in the art.

The storage device 102 also includes one or more volatile memories 117, 118 that can, for example, include a Dynamic Random Access Memory (DRAM) or a Static Random Access Memory (SRAM). For example, as illustrated in FIG. 1, volatile memory 117 may be an SRAM internal to (or integrated into) controller 123 of the storage device 102, while volatile memory 118 may be a DRAM external to (or remote from) controller 123 of the storage device 102. However, in other examples, volatile memory 117 may be a DRAM external to controller 123 and volatile memory 118 may be an SRAM internal to controller 123, volatile memory 117, 118 may both be internal to controller 123 or both be external to controller 123, or alternatively, storage device 102 may include only one of volatile memory 117, 118. Data stored in volatile memory 117, 118 can include data read from the NVM 110 or data to be written to the NVM 110. In this regard, the volatile memory 117, 118 can include a write buffer or a read buffer for temporarily storing data.

The memory (e.g. NVM 110) is configured to store data 119 received from the host device 104. The data 119 may be stored in the cells 116 of any of the NVM memory locations 112. As an example, FIG. 1 illustrates data 119 being stored in different NVM memory locations 112, although the data may be stored in the same NVM memory location. In another example, the NVM memory locations 112 may be different dies, and the data may be stored in one or more of the different dies.

Each of the data 119 may be associated with a logical address. For example, the volatile memory 118 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a physical address associated with each memory location 112 in the NVM where data is stored. While FIG. 1 illustrates a single L2P mapping table 120 stored in volatile memory 118, in other examples, the L2P mapping table 120 may include multiple tables stored in volatile memory 118. Mappings may be updated in the L2P mapping table 120 respectively in response to host writes, and periodically the L2P mapping table 120 may be flushed from volatile memory 118 to one or more of the NVM memory locations 112 of NVM 110 so that the mappings may persist across power cycles. In the event of a power failure in storage device 102, the L2P mapping table 120 in volatile memory 118 may be recovered during initialization from the L2P entries previously stored in NVM 110.

Figure 2:
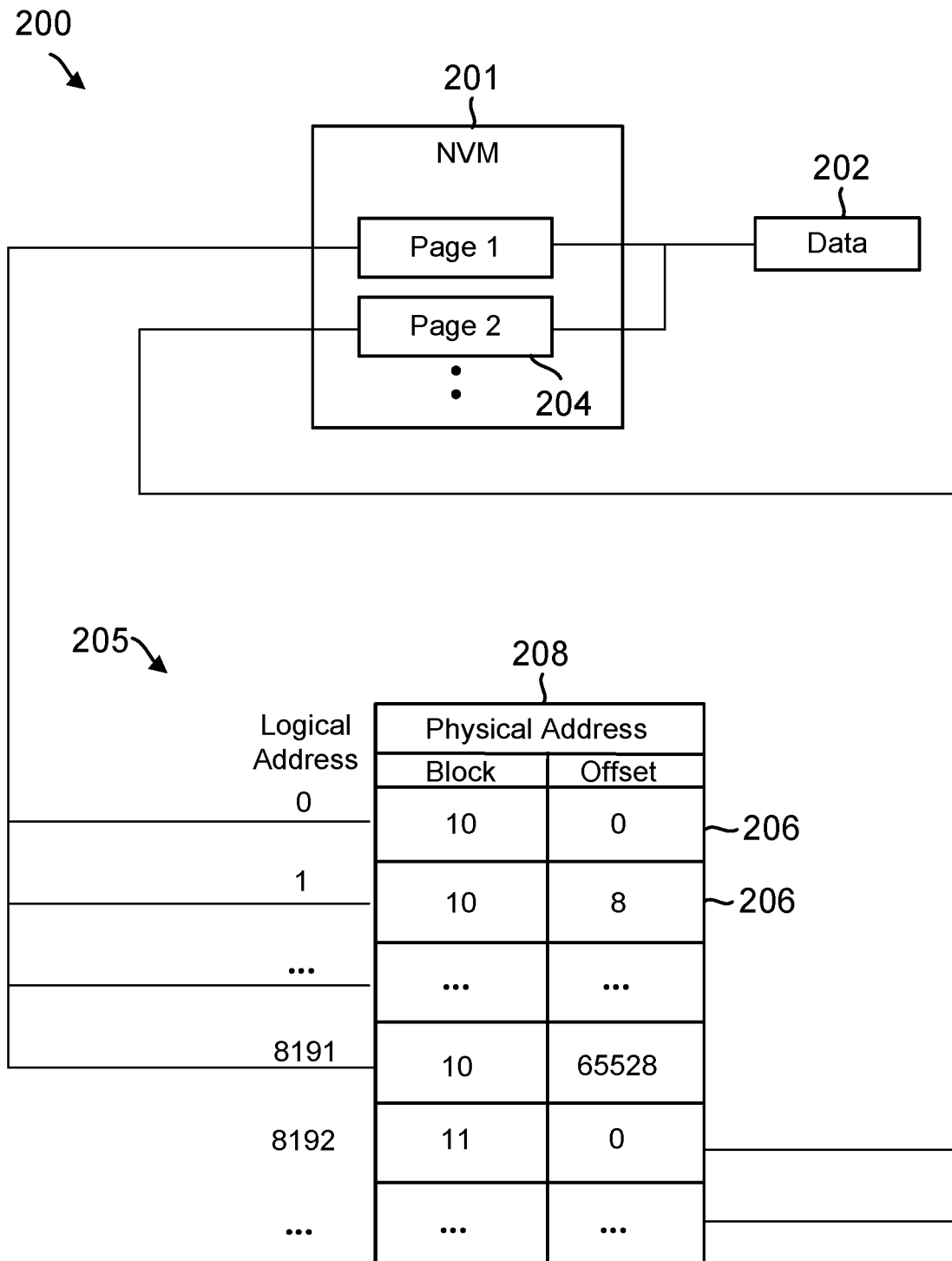
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 stored in volatile memory (e.g., the volatile memory 118 of FIG. 1) illustrating the mapping of data 202 received from a host device to logical addresses and physical addresses in NVM 201 (e.g., the NVM 110 of FIG. 1). The data 202 may correspond to the data 119 in FIG. 1, while the L2P mapping table 205 may correspond to the L2P mapping table 120 in FIG. 1. In one example, the data 202 may be stored in one or more pages 204 (e.g., physical pages) in NVM 201. Each page 204 may be associated with a mapping set including one or more entries 206 of the L2P mapping table 205 respectively identifying a physical address 208 mapped to a logical address (e.g., a logical block address (LBA)) associated with the data written to the NVM. A logical page may include one or more of the entries 206. An LBA may be a logical address specified in a write command for the data received from the host device. Physical address 208 may indicate the block and the offset at which the data associated with an LBA is physically written, as well as a length or size of the written data (e.g. 4 KB or some other size). In the illustrated example, page 204 encompassing 32 KB of data 202 may be associated with a mapping set including 8192, 4 KB entries. However, in other examples, page 204 may encompass a different amount of host data (e.g. other than 32 KB of host data) or may include a different number of entries 206 (e.g., other than 8192 entries), or entries 206 may respectively include different host data lengths (e.g., other than 4 KB each).

Referring back to FIG. 1, the NVM 110 includes sense amplifiers 124 and data latches 126 connected to each NVM memory location 112. For example, the NVM memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the NVM memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the NVM memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a system on a chip (SoC), a Field Programmable Gate Array (FPGA), hard-wired logic, analog circuitry and/or a combination thereof.

The controller 123 is configured to receive data transferred from one or more of the cells 116 of the various NVM memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the volatile memory 118 when reading or writing data to the cells 116. For example, the controller 123 may receive logical-to-physical address mappings from the volatile memory 118 in response to read or write commands from the host device 104, identify the physical addresses mapped to the logical addresses identified in the commands (e.g. translate the logical addresses into physical addresses), and access or store data in the cells 116 located at the mapped physical addresses. The controller 123 is also configured to access the L2P mapping table 120 in the NVM 110, for example, following a power failure during initialization, to recover or populate the L2P mapping table 120 in the volatile memory 118.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a NVM memory location 112 in the NVM 110 of storage device 102 for storing the data. The controller 123 stores the L2P mapping in the L2P mapping table 120 to map a logical address associated with the data to the physical address of the NVM memory location 112 allocated for the data. The controller 123 then stores the data in the NVM memory location 112 by sending it to one or more data latches 126 connected to the allocated NVM memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the L2P mapping table 120 to translate the logical addresses specified in the read command to the physical addresses indicating the location of the data. The controller 123 then reads the requested data from the NVM memory location 112 specified by the physical addresses by sensing the data using the sense amplifiers 124 and storing them in data latches 126 until the read data is returned to the host 104 via the host interface 106.

Figure 3:
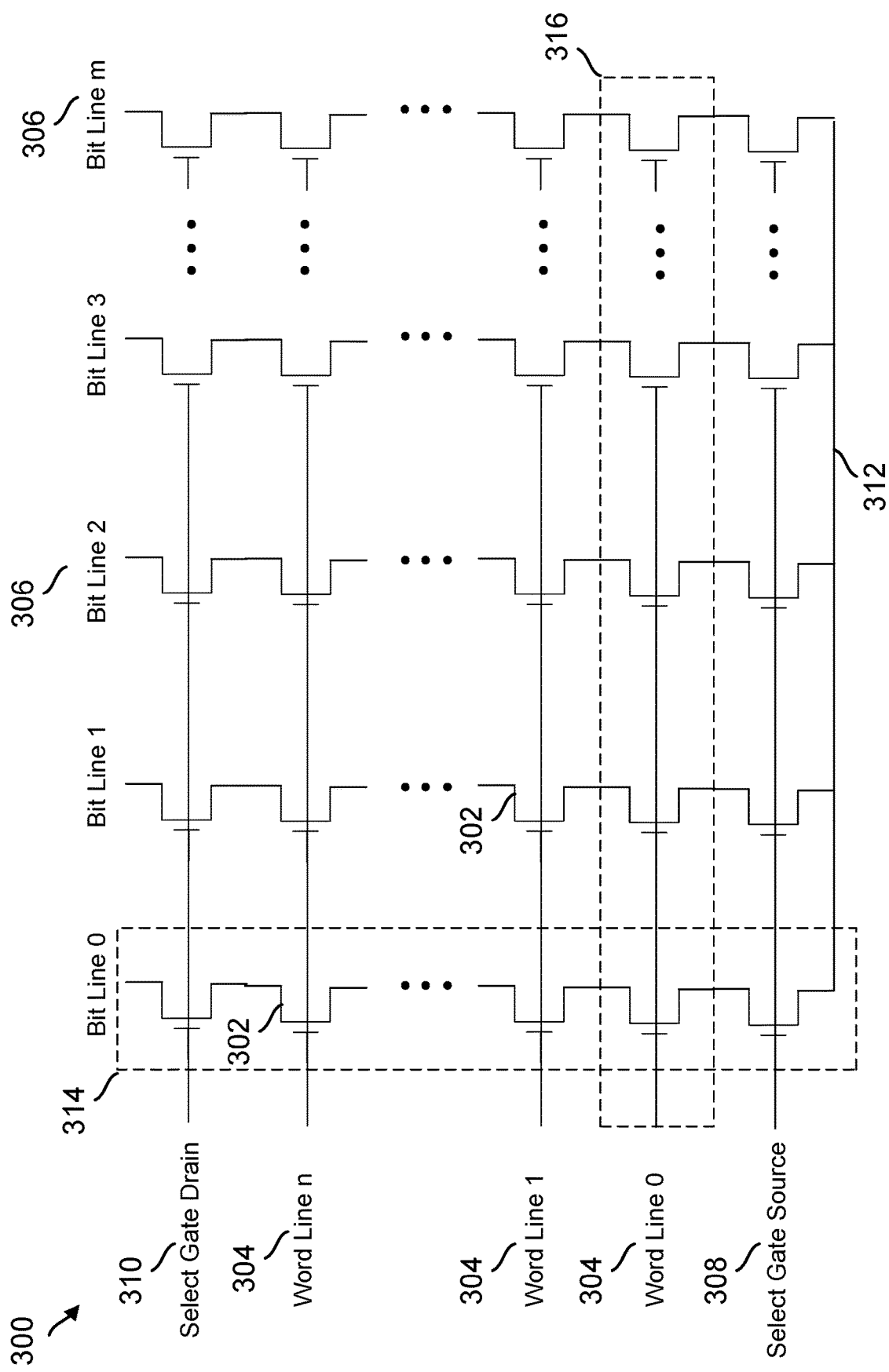
FIG. 3 is a conceptual diagram illustrating an example of a two dimensional array of memory cells in the storage device of FIG. 1.

FIG. 3 illustrates an example of a two-dimensional (2D) NAND memory array 300 of cells 302. Cells 302 may correspond to cells 116 in the NVM 110, 201 of FIGS. 1 and 2. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
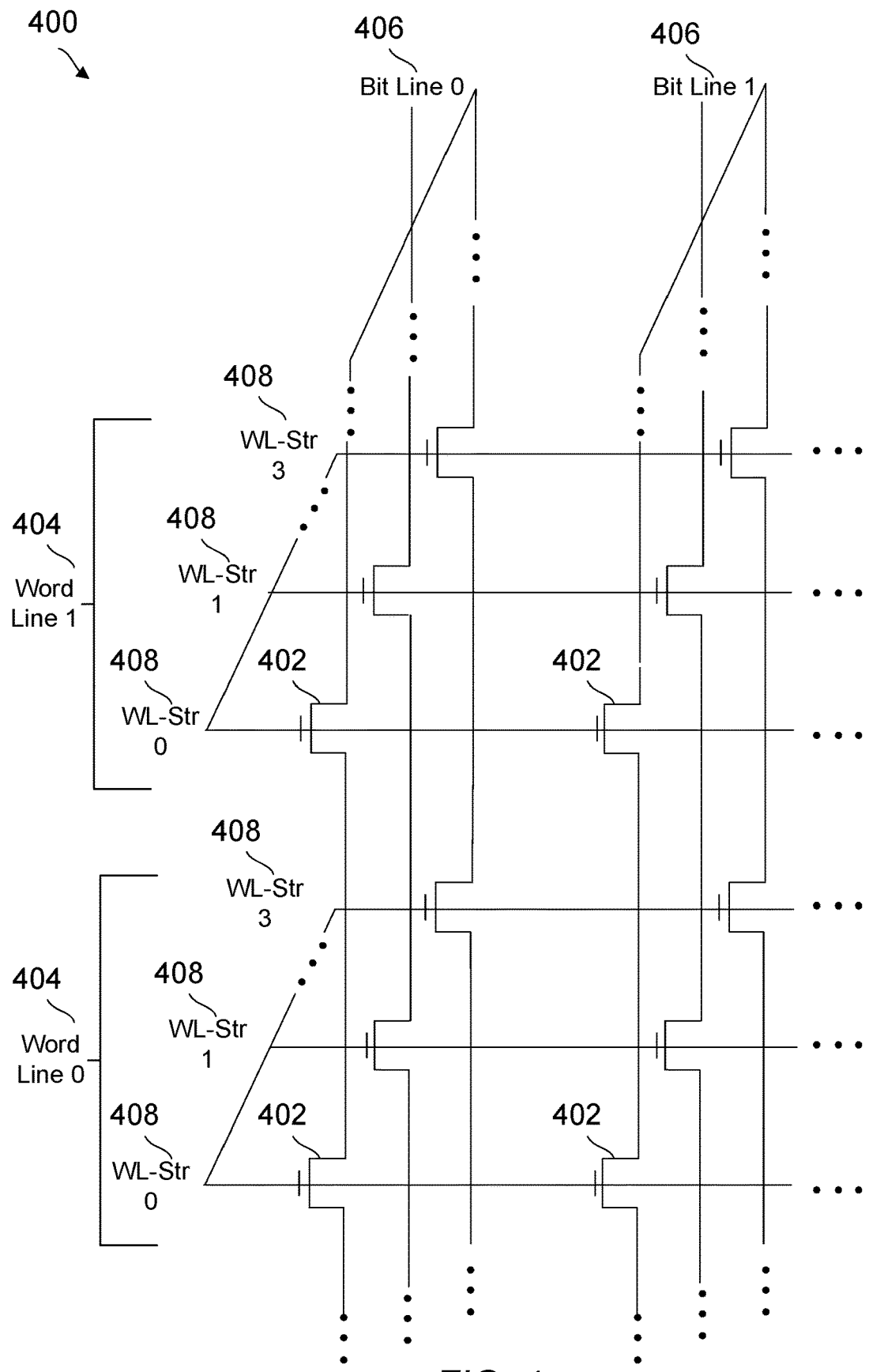
FIG. 4 is a conceptual diagram illustrating an example of a three dimensional array of memory cells in the storage device of FIG. 1.

FIG. 4 illustrates an example of a three-dimensional (3D) NAND memory array 400 of cells 402. Cells 402 may correspond to cells 116 in the NVM 110, 201 of FIGS. 1 and 2. As in the 2D memory array 300 of FIG. 3, multiple cells 402 may be coupled to word lines 404 and bit lines 406. However, in the 3D memory array 400, the word lines 404 may each include multiple word line strings 408, and the bit lines 406 may be connected to each of the word line strings 408. Similarly, SGS cells and SGD cells (not shown) may respectively connect the memory cells in each word line string 408 to the source line (not shown) and bit lines 406. Thus, 3D memory array 400 may store more individually accessible pages of data on each word line 404 (e.g. in word line strings 408) than 2D memory array 300. While the 3D memory array 400 illustrated in FIG. 4 includes an example of four word line strings 408 for each word line 404, the word lines 404 may include other numbers of word line strings 408 in other examples.

Figure 5:
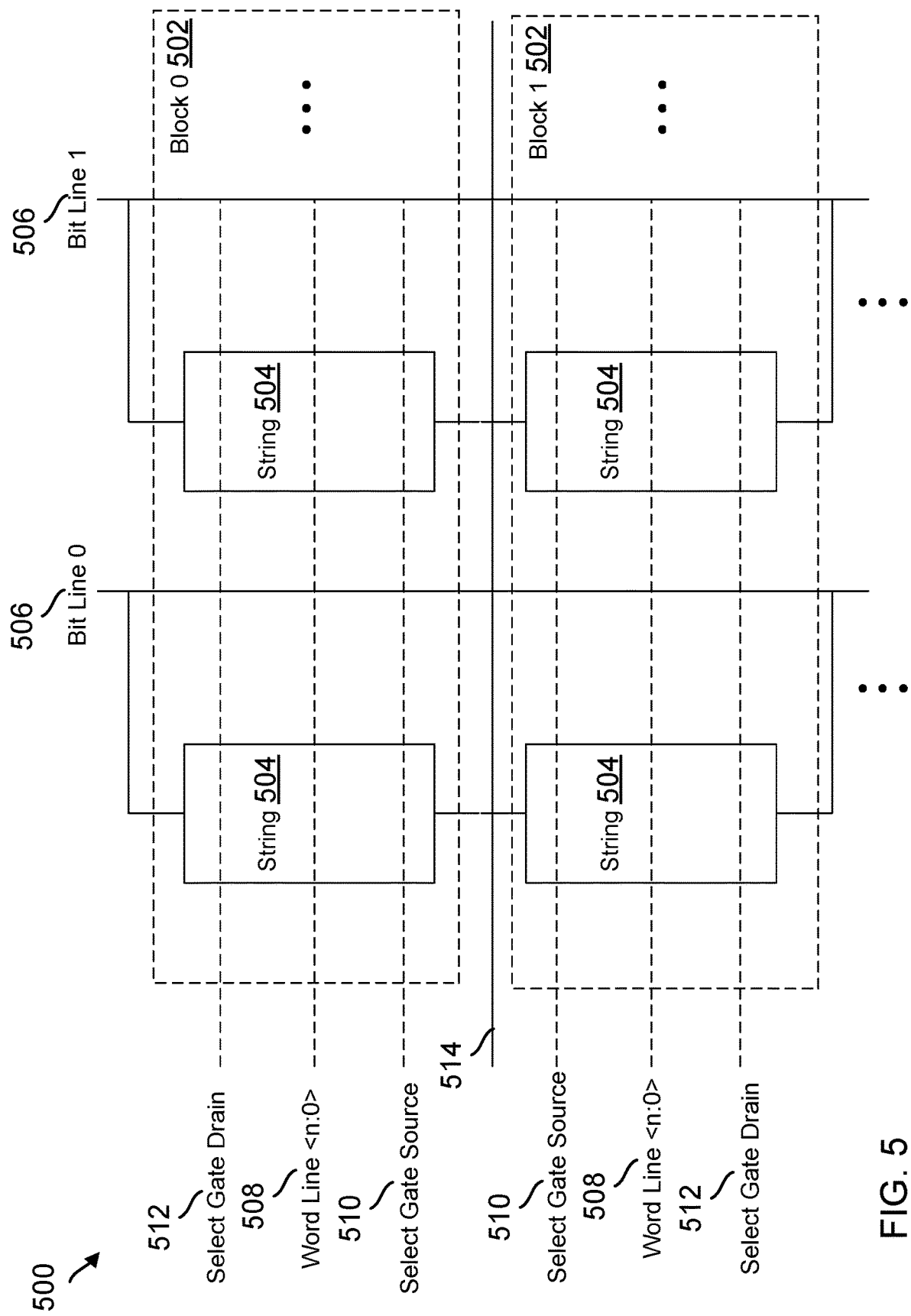
FIG. 5 is a conceptual diagram illustrating an example of a two dimensional array of blocks in the storage device of FIG. 1.

FIG. 5 illustrates an example of a 2D NAND memory array 500 of blocks 502 including multiple strings 504. Blocks 502 may correspond to blocks of a die 114 in the NVM 110, 201 of FIGS. 1 and 2, and strings 504 may each correspond to string 314 in FIG. 3. As in the memory array 300 of FIG. 3 and the memory array 400 of FIG. 4, each string 504 may include a group of memory cells (e.g., cells 302, 402) each coupled to a bit line 506 and individually coupled to respective word lines 508. Similarly, each string may include a SGS cell 510 and SGD cell 512 which respectively connects the memory cells in each string 504 to a source line 514 and bit line 506.

Figure 6:
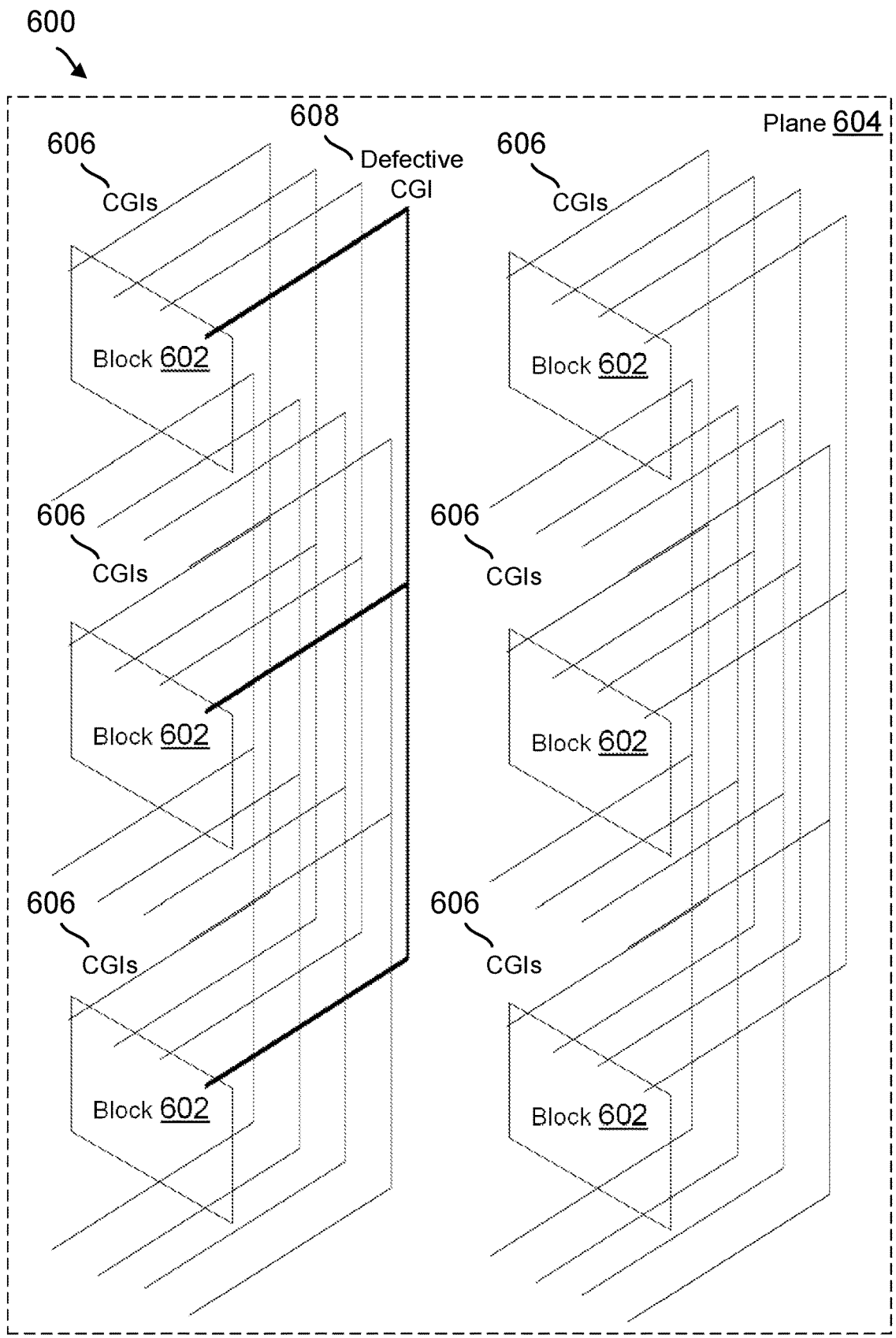
FIG. 6 is a conceptual diagram illustrating an example of a three dimensional (3D) array of blocks in the storage device of FIG. 1.

FIG. 6 illustrates an example of a 3D NAND memory array 600 of blocks 602 in a plane 604. Blocks 602 may correspond to blocks of a plane of a die 114 in the NVM 110, 201 of FIGS. 1 and 2, with blocks on the left-side of FIG. 6 being closer to a center of the 3D NAND array (referred to as "inner blocks") and blocks on the right-side of FIG. 6 being closer to an edge of the 3D NAND array (referred to as "outer blocks"). As in the memory array 500 of FIG. 5, although not shown in FIG. 6, each block 602 may include multiple strings including respective groups of memory cells coupled to respective bit lines and individually to respective word lines or word line strings. Similarly, although also not shown in FIG. 6, SGS cells and SGD cells may respectively connect the memory cells in each word line or word line string to the source line and bit lines.

A plurality of global interconnects may run between respective blocks 602 in the 3D memory array 600, which throughout this disclosure are referred to as common global interconnects (CGIs) (although they may be referenced by other names). In this example, CGIs 606 are global wires or lines that may be configured to drive local word lines with voltages for NAND operations such as erase, program, or read operations. For instance, each CGI may be configured to connect to (and disconnect from) different word lines in a respective block in FIG. 6 so as to drive these word lines to a pass voltage VPASS prior to a respective program operation for that block. For example, 3D memory array 600 may include transistors, switches, or other hardware components that electrically couple, and thus enable or disable voltage passing from, CGIs 606 to respective word lines in blocks 602. In the example of FIG. 6, eight CGIs may be configured to connect to different word lines of a respective block 602, including four CGIs positioned above the respective block and four CGIs positioned below the respective block, with each of the 8 CGIs being configured to connect to $\frac{1}{8}^{th}$ of the word lines in the block. However, the quantity of CGIs per block (and per side), the position of the CGIs per block, and/or the quantity of word lines per block connectable to each CGI, may be different in other examples.

Furthermore, different CGIs may be part of a single CGI set, and the CGIs 606 in one CGI set may respectively drive multiple, different word lines of respective blocks. For instance, in the example of FIG. 6, the eight CGIs surrounding a given block may be part of one CGI set, and each of the eight CGIs may interconnect between and drive the same (common) word lines in multiple respective blocks. As an example, one CGI in a CGI set may drive the same ⅛ of the word lines in each of the three inner blocks on the left side of FIG. 6. Thus, one CGI set may drive all of the word lines of multiple blocks in a single plane. Additionally, multiple CGI sets respectively including different CGIs interconnected between respective blocks may be part of a single plane 604. For instance, in the example of FIG. 6, the eight CGIs interconnecting the three inner blocks of plane 604 may be part of one CGI set, while the eight CGIs interconnecting the three outer blocks of plane 604 may be part of another CGI set. These quantities again are just examples; it should be understood that quantities may be different in other examples for the number of CGIs in a given CGI set, and/or the number of blocks associated with a given CGI set in a particular plane (e.g., the quantity of blocks interconnected between, or including word lines driven by, CGIs of a particular CGI set). Additionally, while FIG. 6 is described using an example where plane 604 includes two CGI sets, in other examples, plane 604 may include four CGI sets or other numbers of CGI sets.

When the controller 123 reads data from or writes data to a page 316 of cells 302, 402 (i.e. on a word line 304, 404, 508 or word line string 408) in a block 502, 602, the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302, 402. For example, during an SLC read operation, if the threshold voltage of a cell 302, 402 is smaller than the read voltage (i.e. current flows through the cell in response to the read voltage), the controller 123 may determine that the cell stores a logic '1', while if the threshold voltage of the cell 302, 402 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302, 402 on the word line 304, 404, 508 or word line string 408 until the cell reaches the threshold voltage, and during an erase operation, the controller may send a command to apply an erase voltage to the block 502, 602 including the cells 302, 402 (e.g. to a substrate of the cells such as a p-well) until the cells reduce back below the threshold voltage (back to logic '1').

For cells that store multiple bits (e.g. MLCs, TLCs, etc.), each word line 304, 404, 508 or word line string 408 may include multiple pages 316 of cells 302, 402, and the controller 123 may similarly send commands to apply read or program voltages to the word lines or word line strings to determine the read or programmed state of the cells based on a threshold voltage of the cells. For instance, in the case of TLCs, each word line 304, 404, 508 or word line string 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 404, 508 or word line string 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 7:
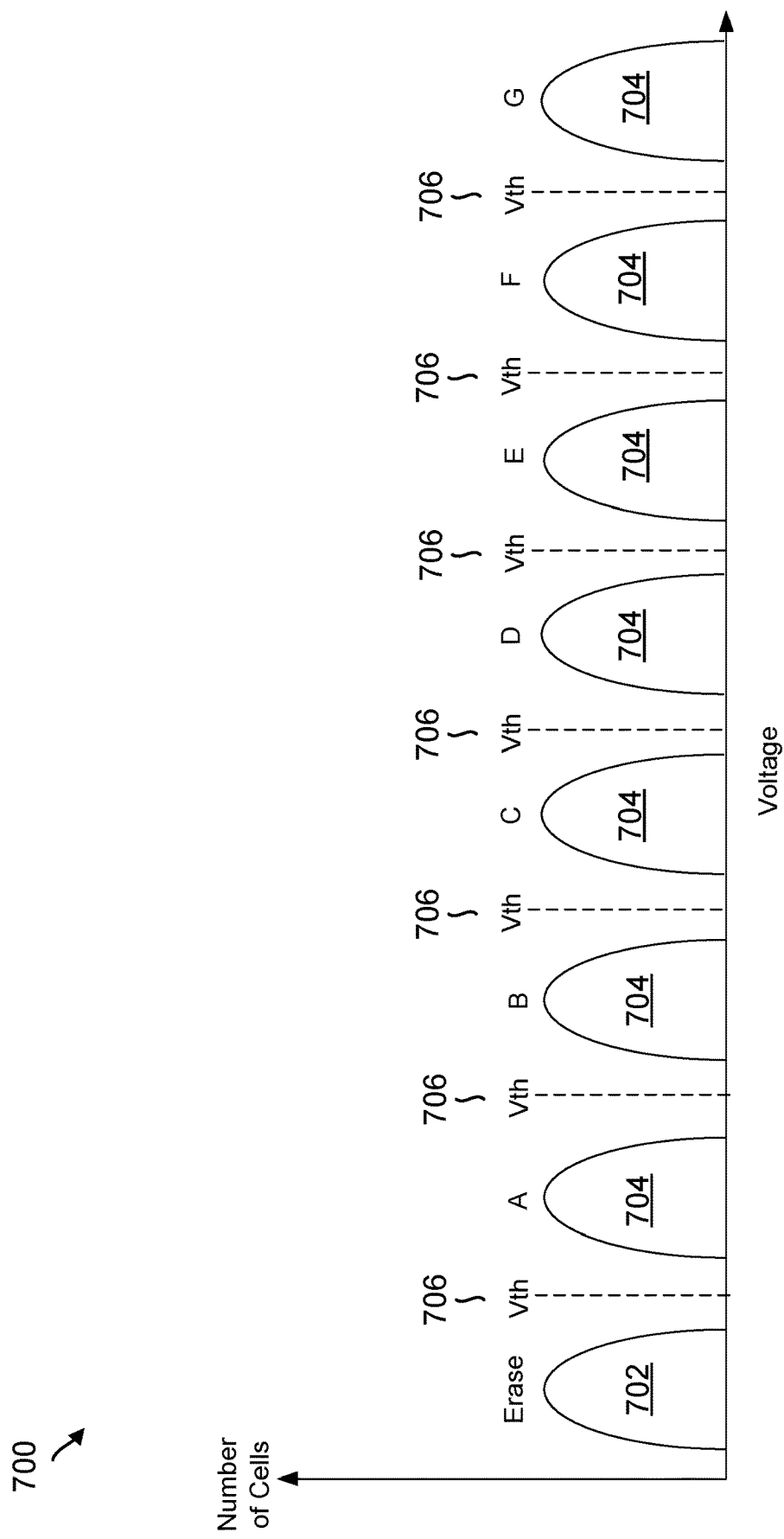
FIG. 7 is a graphical diagram illustrating an example of a voltage distribution chart for triple-level cells in the storage device of FIG. 1.

FIG. 7 illustrates an example of a voltage distribution chart 700 illustrating different NAND states for TLCs (e.g. cells 116, 302, 402) storing three bits of data (e.g. logic 000, 001, etc. up to logic 111). The TLCs may include an erase state 702 corresponding to logic '111' and multiple program states 704 (e.g. A-G) corresponding to other logic values '000-110'. The program states 704 may be separated by different threshold voltages 706. Initially, the cells 116, 302, 402 may be in the erase state 702, e.g. after the controller 123 erases a block 502, 602 including the cells. When the controller 123 program LPs, MPs, and UPs as described above, the voltages of the cells 116, 302, 402 may be increased until the threshold voltages 706 corresponding to the logic values to be stored are met, at which point the cells transition to their respective program states 704. While FIG. 7 illustrates eight NAND states for TLCs, the number of states may be different depending on the amount of data that is stored in each cell 116, 302, 402. For example, SLCs may have two states (e.g. logic 0 and logic 1), MLCs may have four states (e.g. logic 00, 01, 10, 11), and QLCs may have sixteen states (e.g. erase and A-N).

When the controller 123 attempts to program cells of a selected word line or word line string into a program state 704, the controller generally performs ISPP over a number of programming loops or ISPP cycles. For example, the controller may apply a programming voltage (e.g. a high voltage) to the selected word line 304, 404, 508 or word line string 408, a pass through voltage (e.g. a high voltage lower than the programming voltage) to the other word lines 304, 404, 508, a bit line program voltage (e.g. a low voltage) on the bit lines connected to the selected cells being programmed on the selected word line, and a bit line inhibit voltage (e.g. a high voltage) on the bit lines connected to the other cells not being programmed on the selected word line. Applying a high programming voltage to the selected word line allows electrons to tunnel from the channel into the charge trapping layer of those cells, thereby causing the threshold voltage of the cells to increase. After the programming voltage is applied, the controller applies a program verify voltage (e.g. a low voltage) to the word line 304, 404, 508 or word line string 408 to determine whether the threshold voltage of the cells exceeds a threshold voltage 706 corresponding to the program state 704. If the threshold voltage of the cells does not exceed the threshold voltage 706, the controller may determine that the cells 302, 402 are still in the erase state 702. Accordingly, in the next programming loop or ISPP cycle, the controller may apply a higher programming voltage to further increase the threshold voltage of the cells, and then again may apply a program verify voltage to determine whether the new threshold voltage exceeds the threshold voltage 706. The controller may similarly repeat the above process of incrementally increasing the programming voltage and verifying the voltage threshold of the selected cells over a number of programming loops. If the threshold voltage of the cells exceeds the threshold voltage 706 and the total number of programming loops does not exceed a predetermined loop count, the controller may determine that the cells have entered the program state 704 and are thus successfully programmed.

However, in many cases, the cells 116, 302, 402 may not successfully reach the program state 704, resulting in program failure. In one example, a physical defect such as a short may exist in the NAND memory array 300, 400 causing charge leakage (e.g. a global control gate (CG) defect, leakage between a word line and another word line or a dummy word line, leakage between a word line and a memory hole, SGD leakage, SGS leakage, source select gate line (SGSB) leakage, and local block select line (Blk_select-LI) leakage). In another example, the threshold voltage distribution or voltage noise level of the cells in a word line may be abnormal (e.g. the threshold voltages of cells in the program state 704 may overlap with the threshold voltages of cells in the erase state 702). In a further example, process variations in the cells 302, 402 may prevent the threshold voltage of the cells from exceeding the threshold voltage 706 within the predetermined loop count (e.g. the maximum number of ISPP cycles). In such cases, when the controller performs ISPP to program the cells of a word line, one or more cells in the word line may not successfully transition into the program state 704 within the maximum number of ISPP cycles. As a result, the controller may determine that a program failure has occurred, and the controller may identify the memory location 112 or block 502, 602 that included the failed word line as a GBB.

In some cases, a program failure may occur due to a defect between a local word line (e.g., one of the word lines 304, 404, 508 or word line strings 408) and one of the global interconnects (e.g., CGIs 606) between multiple blocks 502, 602 respectively including the local word line. For instance, in the example of FIG. 6, a defective CGI 608 may cause a short circuit in one of the word lines 304, 404, 508 or word line strings 408 in one of the inner blocks on the left side of FIG. 6. This defective CGI may not only affect the shorted word line in this block, but also the word lines or word line strings electrically coupled to this defective CGI in this and other blocks (the blocks between which the CGI is interconnected). Therefore, in contrast to the other defects previously noted, a CGI-WL defect may cause back-to-back program failures in multiple blocks in the same plane (or die) whenever the controller 123 attempts to program these word lines 304, 404, 508 or word line strings 408 in any of these blocks 502, 602, resulting in the controller inefficiently identifying numerous GBBs and replacing these GBBs with numerous blocks. If the population of available blocks thus ends up decreasing to such an extent that no available blocks remain to replace subsequent GBBs, the storage device may enter a read-only mode, leading to significant reduction of performance.

Figure 8:
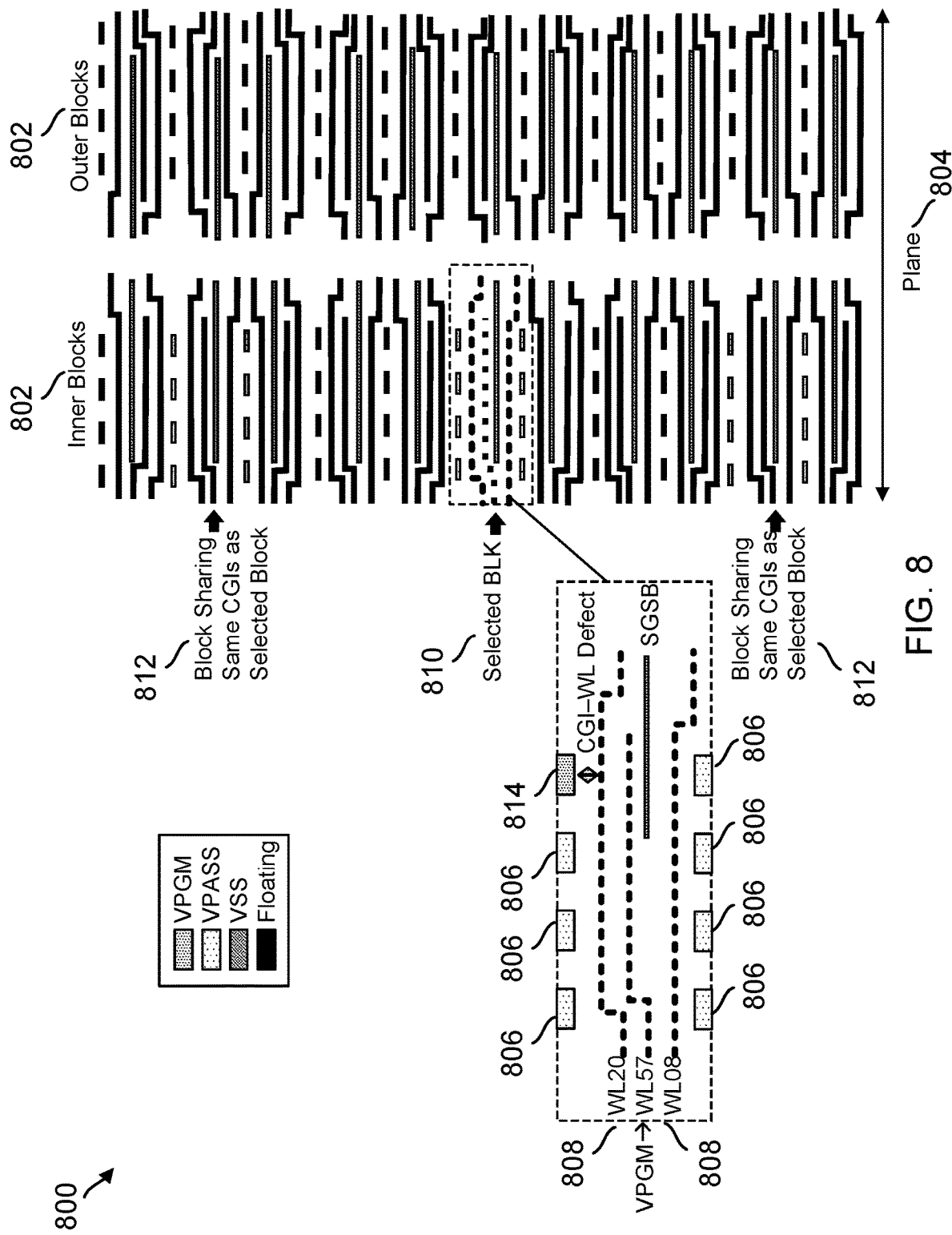
FIG. 8 is a schematic diagram illustrating an example of a section of a 3D NAND memory array.

FIG. 8 illustrates an example schematic of a section of a 3D NAND memory array 800 including blocks 802 (e.g., blocks 502, 602 including inner blocks and outer blocks) in a plane 804 (e.g., plane 604), CGIs 806 (e.g., CGIs 606) interconnected between the blocks 802, and word lines 808 (e.g., word lines 304, 404) in each block that are respectively driven by the CGIs 806. Similar to the example of FIG. 6, here the word lines 808 in each block 802 may be electrically coupled to one of eight CGIs surrounding the block 802, although in other examples the number of CGIs may be different. Moreover, the CGIs 806 interconnected between blocks 802, including a selected block 810 for programming and blocks 812 sharing same CGIs as the selected block 810, may be within a same CGI set, with plane 804 in this example including four CGI sets each associated with different groups of blocks.

In an example program operation of a particular WL 57 in the selected block 810 of FIG. 8, the controller 123 may apply a programming voltage VPGM on WL 57. During this time, a pass through voltage VPASS may be applied on the other word lines 808 in the selected block 810 (e.g., WL 20, WL 8, and other WLs not shown in the illustrated example). For instance, prior to the program operation, the CGIs 806 in a CGI set associated with this block 802 may be biased to VPASS, and the CGIs 806 may drive respective word lines 808 in the blocks 802 associated with the CGI set including WL 20, WL 8, etc. to VPASS at the time VPGM is being applied to WL 57. SGSB may also be maintained at a particular bias (e.g., a high voltage Vss) to enable the program operation. Other word lines in other blocks that are to be unaffected by the program operation may remain floating. However, if a short happens to exist between the programmed word line and one of the CGIs 806 in the set (i.e., a CGI-WL defect), then the CGI may not be VPASS as intended but instead be driven to VPGM. For instance, a short with WL 57 may cause defective CGI 814 (e.g., defective CGI 608) to be driven to VPGM instead of VPASS. As a result of this voltage increase, program failures may occur not only in the selected block 810 at WL 57 and the other word lines 808 which are driven by the defective CGI 814 in that block, but also in the word lines 808 including WL 57 of the other blocks 812 between which defective CGI 814 is interconnected. Thus, back-to-back program failures may result in blocks 802 associated with the same CGI set.

Figure 9:
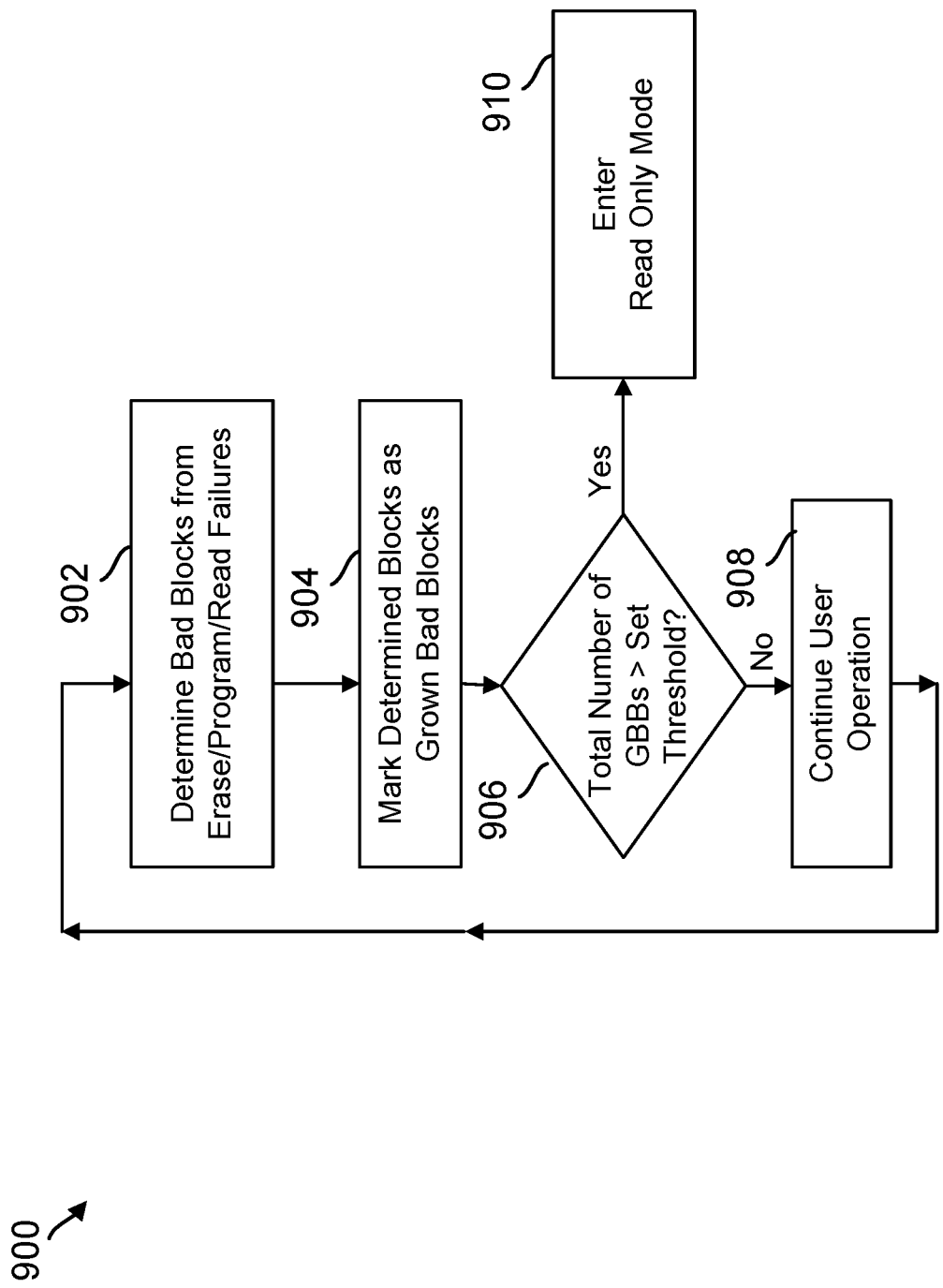
FIG. 9 is a flow chart illustrating an example of a method for handling grown bad blocks (GBBs) in the storage device of FIG. 1.

FIG. 9 illustrates an example flow chart 900 of a method for handling bad blocks. For example, the method can be carried out in a storage device 102 such as the one illustrated in FIG. 1. Each of the steps in the flow chart can be controlled using the controller as described below (e.g. controller 123), by a component or module of the controller, or by some other suitable means.

Figure 13:
FIG. 13 is a conceptual diagram illustrating an example of an error log indicating successful and failed NAND operations in a given bad block in the storage device of FIG. 1.

As represented by block 902, the controller may determine one or more bad blocks in the storage device 102 in response to erase failures, program failures, and/or read failures. For example, the controller may determine the logical addresses of block(s) in which an erase failure, program failure, and/or read failure had previously occurred (e.g., from an error log such as illustrated in FIG. 13 or by some other means). Then, as represented by block 904, the controller may mark these one or more bad blocks as GBBs. For example, the controller may designate the determined block(s) at block 902 as GBBs, and the controller may store the logical addresses of these GBBs in a bad block table such as illustrated in FIG. 12. If, as represented by block 906, the controller determines that the current, total number of GBBs does not exceed a configured threshold, then as represented by block 908, the controller may continue user operation. For example, the controller may allocate free blocks in replacement of those blocks marked as GBBs, continue executing program, erase, or read operations, and repeat bad block determinations at block 902 in the event other failure(s) have occurred. On the other hand, if at block 906 the controller determines that the total number of GBBs exceeds the configured threshold, then as represented by block 910, the controller may enter a read only mode to prevent future GBBs from arising in response to erase or program errors.

However, if this bad block determination at block 902 and GBB marking at block 904 is performed without regard to CGI-WL defects (or other global-local line defects), then entering the read-only mode at block 910 may be inevitable. Generally, the read-only threshold considered at block 906 is configurable based on an amount of storage device capacity the controller is requested or determines to expose to the host. For example, if the requested capacity of the storage device is 100 blocks, if there are 150 blocks available in total (e.g., an extra margin or overprovisioning of 50 blocks are used to replace GBBs), and if during factory testing, 30 of these 50 overprovisioned blocks have been identified as GBBs (resulting in a 20 block margin remaining), then the controller may set the read-only threshold to no more than 20 (since any larger quantity would end up consuming the requested drive capacity). However, if a CGI-WL defect or other global-local line defect results in many consecutive program failures, the number of determined and marked GBBs may rapidly increase towards this threshold (e.g., 20 GBBs) until the threshold ends up being exceeded at block 906. For example, the controller may end up entering the read-only mode at block 910 in response to at most 20 back-to-back program failures in different blocks associated with the same CGI set. Therefore, it would be helpful to apply a different block handling process which accounts for such CGI-WL defects to minimize or even avoid entry into the read-only mode.

Figure 10:
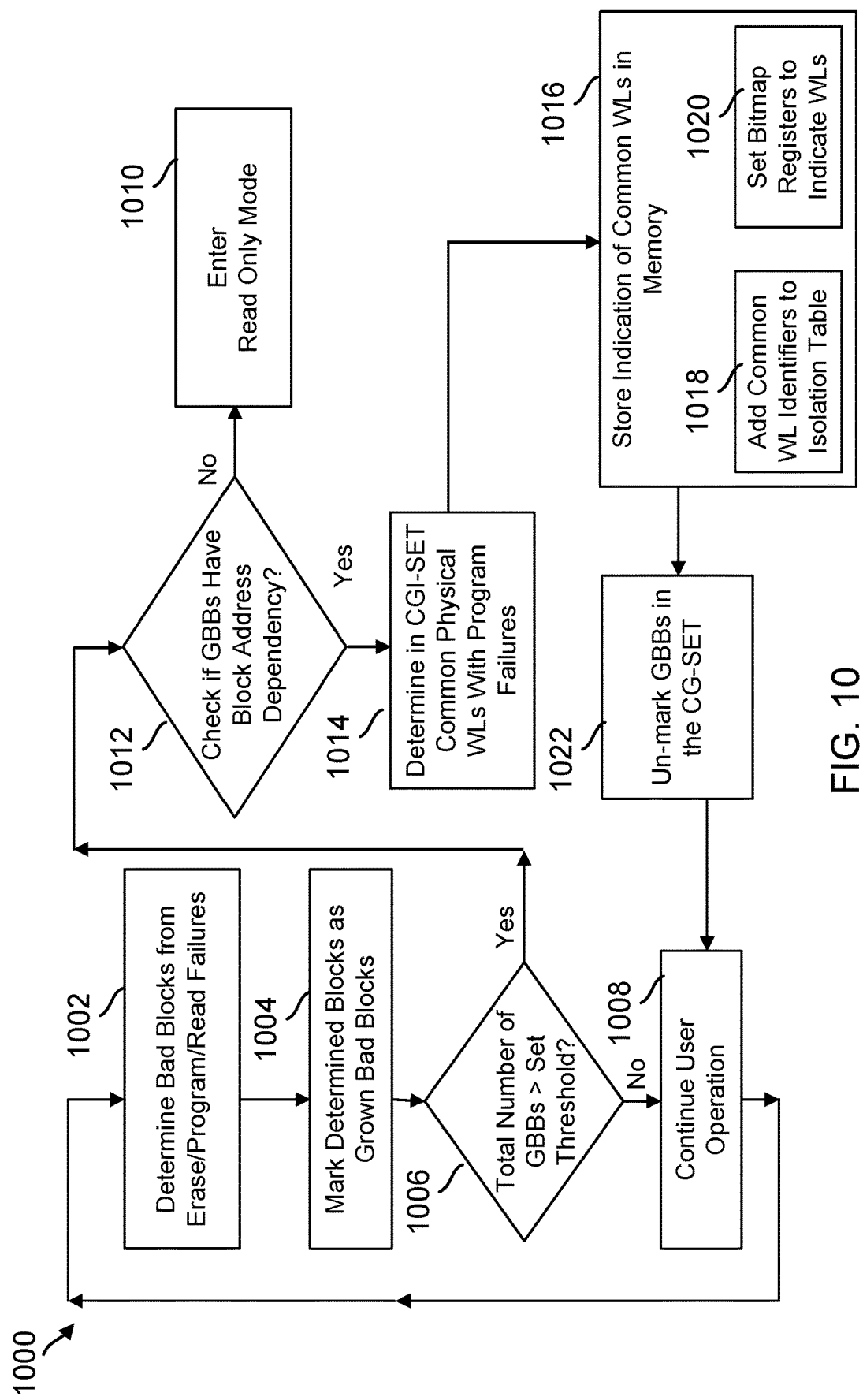
FIG. 10 is a flow chart illustrating an example of a method for handling GBBs with common global interconnect (CGI)-word line (WL) defects, as performed by the storage device of FIG. 1.

FIG. 10 illustrates an example flow chart 1000 of a method for handling bad blocks while accounting for CGI-WL defects. For example, the method can be carried out in a storage device 102 such as the one illustrated in FIG. 1. Each of the steps in the flow chart can be controlled using the controller as described below (e.g. controller 123), by a component or module of the controller, or by some other suitable means.

In the example of FIG. 10, blocks 1002, 1004, 1006, 1008, and 1010 are identical to those of blocks 902, 904, 906, 908, and 910 respectively. However, if at block 1006 the controller determines that the total number of GBBs exceeds the configured threshold, then rather than immediately entering a read only mode at block 1010 (in contrast to the example of FIG. 9), in this case as represented by block 1012, the controller may determine whether the GBBs depend on block addresses. For instance, the controller may refer to a mapping table such as illustrated in FIG. 11, which maps CGI sets to different block identifiers or logical block addresses, and determine using this table whether a plurality of the GBBs are based on a CGI-WL defect.

FIG. 11 illustrates an example of a mapping table 1100 which controller 123 may maintain in volatile memory 117 and/or volatile memory 118 that associates CGI sets 1102 to block addresses 1104. For blocks 502, 602, 802 in a same CGI set, the controller 123 may assign logical addresses according to a logical address pattern (e.g., LBAs ending with a particular block address value or values), and the controller may store mappings of the logical addresses of these blocks with their respective CGI set in mapping table 1100. For example, as illustrated in FIG. 11, the controller may assign LBAs 102A, 102C, 202A, etc. to respective blocks 810, 812 that are driven by the same set of CGIs 806, with the logical address pattern in this example being LBAs ending in 'A' or 'C', the controller may designate this set of CGIs as CGI-set-4, and the controller may store mappings of these LBAs to CGI-set-4 in mapping table 1100 accordingly. The controller may similarly assign and store mappings of logical addresses of other blocks using other logical address patterns to other respective CGI sets. Thus, in the example of FIG. 11, the controller may designate four CGI sets each including different groups of CGIs 806 (e.g., CGI-set-1, CGI-set-2, CGI-set-3, and CGI-set-4), the controller may assign LBAs ending in '0' and '6' to blocks with word lines driven by CGIs in CGI-set-1, LBAs ending in '2' and '4' to blocks with word lines driven by CGIs in CGI-set-2, LBAs ending in '8' and 'E' to blocks with word lines driven by CGIs in CGI-set-3, LBAs ending in 'A' and 'C' to blocks with word lines driven by CGIs in CGI-set-4, and store mappings of these LBAs to their corresponding CGI sets in mapping table 1100 in volatile memory 117 and/or 118 such as illustrated in FIG. 11.

As previously described with respect to FIG. 8, different blocks 810, 812 may be part of a same CGI set (e.g., the same CGIs interconnect between or drive word line voltages for all these blocks). For instance, in the example of FIG. 8, the selected block 810 being programmed, as well as the blocks 812 sharing same CGIs 806 as the selected block, may all include word lines 808 driven by CGIs 806 in a same CGI set (e.g., the eight CGIs surrounding each of these blocks 802). Thus, if a program failure occurs for a word line in one block of the CGI set, the other blocks of the CGI set will likewise result in program failures for that same word line. For instance, referring to FIGS. 8 and 11, assume in one example that the selected block 810 is associated with LBA 102A and is mapped to CGI-set-4, with the blocks 812 sharing the same CGIs 806 as the selected block in CGI-set-4 being associated with LBAs 102C and 202A and also mapped to CGI-set-4. In such case, if a CGI-WL defect occurs between one of the CGIs 806 in CGI-set-4 and WL 57 in the block 810 associated with LBA 102A as illustrated in FIG. 8, this defective CGI 814 may affect the other blocks 812 associated with LBAs 102C and 202A, and thus result in back-to-back program failures whenever the controller attempts to program at least WL 57 in any of these blocks.

As a result, referring back to FIG. 10, the bad blocks that would thus be determined in response to program failures at block 1002 may quickly result in a significant quantity of GBBs being marked at 1004, resulting in the total number of GBBs rapidly exceeding the configured threshold at 1006. For example, referring to FIG. 11, a CGI-WL defect occurring in the block associated with LBA 102A mapped to CGI-set-4 may result in every other block mapped to CGI-set-4 also becoming GBBs. This result may lead to a read-only mode since the quantity of GBBs associated with a single CGI set may be significant. For example, if the logical address pattern associated with CGI-set-4 includes any LBA ending in 'A' and 'C' such as illustrated in FIG. 11, then every 2 out of 16 blocks in the plane would be mapped to CGI-set-4 in this example. Thus, a single CGI-WL defect in one WL of one block may end up resulting in 12.5% of the total block capacity of the storage device 102 becoming GBBs. Therefore, to avoid immediately entering a read-only mode in response to a CGI-WL defect, the controller may check whether a CGI-WL defect is the cause of the back-to-back GBBs by determining whether these GBBs have a block address dependency at block 1012. For instance, the controller may check if the LBAs of multiple GBBs have a logical address pattern that is identifiable from the LBAs mapped to a single CGI set in the mapping table 1100, such as LBAs ending in 'A' and 'C' in the blocks associated with CGI-set-4. The controller may determine which logical address pattern to compare against the mapping table 1100 from a bad block table including GBBs with program failures, such as illustrated in FIG. 12.

FIG. 12 illustrates an example of a bad block table 1200 which the controller 123 may maintain in volatile memory 117 and/or 118 that includes addresses 1202 of GBBs 1204 that experienced program failures 1206. The controller may refer to the bad block table 1200 as well as the mapping table 1100 to determine whether a plurality of the GBBs are associated with a CGI-WL defect. For instance, in the illustrated example of FIG. 12, bad block table 1200 may include a list of block identifiers or addresses 1202 of GBBs 1204 and their error causes (e.g., blocks 0x000A, 0x000C, 0x001A, 0x001C, 0x002A, 0x002C, 0x024A, and 0x0FFC include program failures 1206 in a given flash interface module 0x02, chip 0x00, memory die 0x02, and plane 0x00), and thus the controller may determine the existence of a logical address pattern of LBAs ending in 'A' and 'C' in GBBs of a same plane experiencing program failures. To determine whether this logical address pattern indicates a CGI-WL defect, the controller 123 may compare this logical address pattern to the mappings in mapping table 1100 of FIG. 11, in response to which comparison the controller may determine that the same logical address pattern is present in LBAs associated with a single CGI set (e.g., CGI-set-4 in the example where the logical address pattern is LBAs ending in 'A' and 'C'). Thus, the controller may determine that these GBBs may be due to a CGI-WL defect involving a CGI in CGI-set-4. By identifying a logical address pattern from bad block table 1200 and comparing this pattern with portions of LBAs associated with different CGI sets in mapping table 1100, the controller may determine whether the blocks are associated with a CGI set much faster than if the controller were to compare entire LBAs in the bad block table 1200 with entire LBAs in the mapping table 1100, since the controller may parse minimal amounts of data to arrive at its determination.

Thus, referring back to FIG. 10, when the controller 123 determines whether GBBs have a block address dependency at block 1012, the controller may determine whether a program failure has occurred in more than one block associated with a CGI set, and thus whether the GBBs indicate a CGI-WL defect. For instance, the controller may access a list of bad blocks (e.g., bad block table 1200 including GBBs) associated with program failures, determine a logical address pattern from the list of bad blocks (e.g., LBAs ending in 'A' and 'C' in the example of FIG. 12), and determine from a mapping table (e.g., mapping table 1100) whether a CGI set is associated with the logical address pattern (e.g., CGI-set-4 in the example of FIG. 11). If the controller does not determine that the GBBs indicate a CGI-WL defect (e.g., if no logical address pattern is found or if a found logical address pattern is not present in LBAs mapped to a single CGI set), then the controller may enter the read only mode at block 1010 as previously described. Otherwise, if the controller does determine the existence of a CGI-WL defect (e.g., that multiple GBBs are associated with a same CGI set), then as represented by block 1014, the controller may identify the physical word lines common to these bad blocks that resulted in program failures and which are associated with the same CGI set. For example, the controller may refer to an error log indicating the success or failure of program operations in respective word lines of a respective one of these blocks, such as illustrated in FIG. 13.

FIG. 13 illustrates an example of an error log 1300 indicating successful NAND operations (e.g., program operations having nand_status: 0) and failed NAND operations (e.g., program operations having nand_status: 1) in a given bad block of the NVM 110. Following determination of GBBs associated with a CGI set, for each GBB, the controller may determine one or more word lines common to these GBBs which resulted in program failure. For instance, in the illustrated example of FIG. 13 . . . the controller may determine that a program failure occurred in WL 57 of a given GBB, as indicated by an error message occurring (e.g., nand_status: 1) over a maximum number of ISPP cycles (e.g., loop_count: 4), and that similar program failures occurred in WL 57 of other GBBs, as illustrated in chart 1310 by WL 57 and its word line strings having a higher block error rate (BER) than other WLs and their word line strings in a given plane. Thus, the controller may determine that WL 57 is a common word line across multiple bad blocks associated with program failure in a CGI set. For instance, the controller 123 may determine that WL 57 in selected block 810 (e.g., block 102A) resulted in program failure in this block as well as in other blocks 810 (e.g., blocks 102C, 202A, etc.) associated with CGI-set-4 from the logged program failures of WL 57 in error log 1300 and the word line's associated significantly higher BER than that of other word lines illustrated in chart 1310.

Accordingly, referring back to FIG. 10, after determining that the GBBs are associated with a CGI-WL defect in block 1012, the controller may determine at block 1014 the logical identifier of one or more common word lines across the GBBs which included an error during programming. For instance, the controller may determine one or more word lines (e.g., WL 57) associated with program failure(s) that are common to multiple GBBs (e.g., blocks 102A, 102C, 202A, etc.) associated with a CGI set (e.g., CGI-set-4), for example, based on an error log, error status, and/or maximum number of program loops and/or a BER of the WL relative to other WLs such as illustrated in FIG. 13. Next, as represented by block 1016, the controller may store an indication of these word line(s) in volatile or non-volatile memory such that the controller may refrain from programming these word line(s) during subsequent program operations. In one example, as represented by block 1018, the controller may add logical identifiers of these word lines and their associated common blocks to a table in volatile memory, such as described below with respect to FIG. 14. For instance, the controller may store logical word line address 57 (corresponding to WL 57) and the LBAs of the blocks associated with CGI-set-4 that resulted in program failure (e.g., LBAs 0x102A, 102C, 202A, etc.) in a table or other data structure in volatile memory 117 and/or 118. In another example, as represented by block 1020, the controller may set one or more flags or bits indicating the word line(s) and their associated CGI set in one or more registers in the NVM 110, 201, such as described below with respect to FIG. 15. For instance, the storage device 102 may include in NVM 110, 201 a first register including a bitmap associated with CGI sets (e.g., with each bit corresponding to a different CGI set) and a second register including a bitmap associated with word lines (e.g., with each bit corresponding to a different word line), and the controller 123 may set one bit corresponding to the CGI-set-4 associated with program failure in the first register and another bit corresponding to the WL 57 that resulted in program failure in the second register.

Afterwards, in either example, as represented by block 1022, the controller may un-mark the GBBs determined at block 1012 to be associated with a CGI-WL defect (e.g., the controller may clear these blocks of a GBB status, remove them from bad block table 1200, or otherwise allocate these blocks to the population of available blocks for programming), and the controller may continue performing program operations or other user operations at block 1008. During this time, the controller may refrain from programming the word line(s) indicated at block 1016. For instance, if WL 57 is added to an isolation table at block 1018, the controller may skip programming WL 57 when it subsequently sends program commands to write data in the blocks 102A, 102C, 202A, etc. associated with CGI-set-4. Alternatively, if WL 57 and CGI-set-4 are indicated as defective in NAND registers at block 1020, the NVM 110, 201 may prevent programming of WL 57 in response to subsequent program commands from the controller to write data in the blocks 102A, 102C. 202A, etc. associated with CGI-set-4. Nevertheless, in either example, the controller may continue to program data in the other word lines in these blocks (e.g., in other word lines of blocks 102A, 102C, 202A, etc. than WL 57), thereby preventing loss of these blocks from becoming GBBs as a result of CGI-WL defects and consequently minimizing entry into a read only mode.

Figure 14:
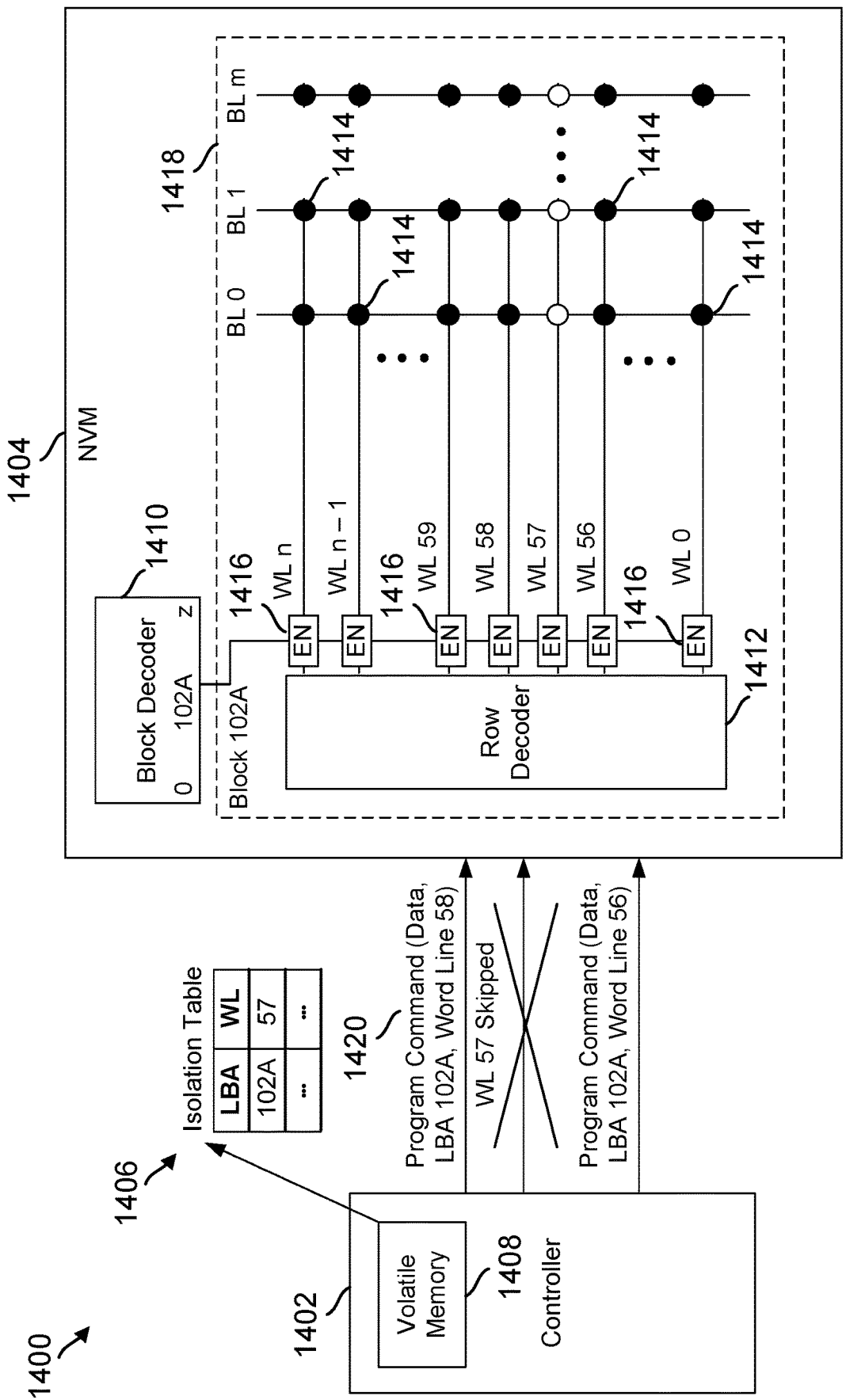
FIG. 14 is a conceptual diagram illustrating an example of a controller that performs program operations in the storage device of FIG. 1 using an isolation table in volatile memory.

FIG. 14 illustrates an example 1400 of a controller 1402 (e.g., controller 123) that performs program operations in an NVM 1404 (e.g., NVM 110, 201) using an isolation table 1406 in volatile memory 1408 (e.g., volatile memory 117 and/or 118). Isolation table 1406 may refer to a table or other data structure in which the controller stores and maintains mappings or associations of logical block identifiers or LBAs of previous GBBs with word lines in which previous program failures have respectively occurred. NVM 1404 may include a block decoder 1410 including circuitry or hardware (e.g., one or more multiplexers, transistors, etc.) configured to decode a logical block identifier or LBA received from controller 123, a row decoder 1412 including circuitry or hardware (e.g., one or more multiplexers, transistors, etc.) configured to decode a word line identifier or word line address received from controller 123, memory cells 1414 (e.g., SLCs, MLCs, etc.) coupled to word lines (WLs) and bit lines (BLs), and enablers 1416 including circuitry or hardware (e.g., one or more switches, transistors, etc.) configured to electrically couple outputs of the row decoder 1412 to the memory cells 1414 in response to a block decoder output indicating a block 1418 (e.g., block 502, 602, 802, 810) for a current NAND operation (e.g., erase, read, program). NVM 1404 may also include other components than those illustrated (e.g., a column decoder coupled to the bit lines, sense amplifiers, latches, etc.).

Before encountering a program failure for a word line in block 1418 (e.g., block 102A in the illustrated example), the controller 1402 may provide program commands 1420 including an LBA, word lines in the block associated with this LBA, and data to be programmed in the memory cells coupled to those word lines. The controller may include in its program commands the identifiers of word lines and blocks that are not stored in the isolation table 1406. In response to respective program commands including LBA 102A and a current word line for programming, the block decoder 1410 may activate the enablers 1416 to allow a program voltage to be output from the row decoder 1412 over the current word line and pass through voltages to be output from the row decoder 1412 over the other word lines to respective memory cells 1414. However in this example, a short between WL 57 and a CGI in a CGI set associated with the block 1418 (e.g., CGI-set-4 in this example) may result in a program failure following an attempt to program data in the cells coupled to WL 57, and the controller may mark block 102A as a GBB. The controller may subsequently determine that the GBB is associated with a CGI-WL defect based, for example, on the mapping table 1100 and bad block table 1200 as previously described. Following this determination, the controller may identify WL 57 as a common word line(s) associated with a program failure in different blocks associated with CGI-set-4 (including block 1418, in this example with LBA 102A) based, for example, on the error log, error status, maximum loop count, and/or relative BER of WL 57.

After the controller identifies the common word line(s) associated with program failures, the controller 123 may store these word line(s) and their associated block identifiers in the isolation table 1406. For instance, following a determination that a program failure occurred in WL 57 in multiple ones of the blocks mapped to CGI-set-4, the controller may store an association of WL 57 with LBA 102A (corresponding to block 1418), as well as associations of WL 57 with other blocks in the same CGI set (e.g., LBAs 102C, 202A, etc.) in isolation table 1406. The controller may also un-mark this block and other blocks associated with the same CGI set as GBBs. Following re-allocation of these blocks to the population of available blocks (not GBBs), the controller 123 may again start to perform NAND operations in block 1418 while again referring to the isolation table 1406 in determining whether or not to refrain from programming certain word line(s) in the NVM 1404. For instance, in response to determining that isolation table 1406 includes a mapping of WL 57 to LBA 102A, the controller may exclude word line 57 in its program commands 1420 to the NVM 1404 as illustrated in FIG. 14, although the controller may still program data in the block associated with LBA 102A on other word lines not found in the isolation table (e.g., word line 56, word line 58, etc. as illustrated in FIG. 14). In this way, the controller may continue to program data in other word lines of the block that do not include the CGI-WL defect without losing the entire block as a GBB, while also minimizing the likelihood of entering a read only mode from large quantities of GBBs.

Figure 15:
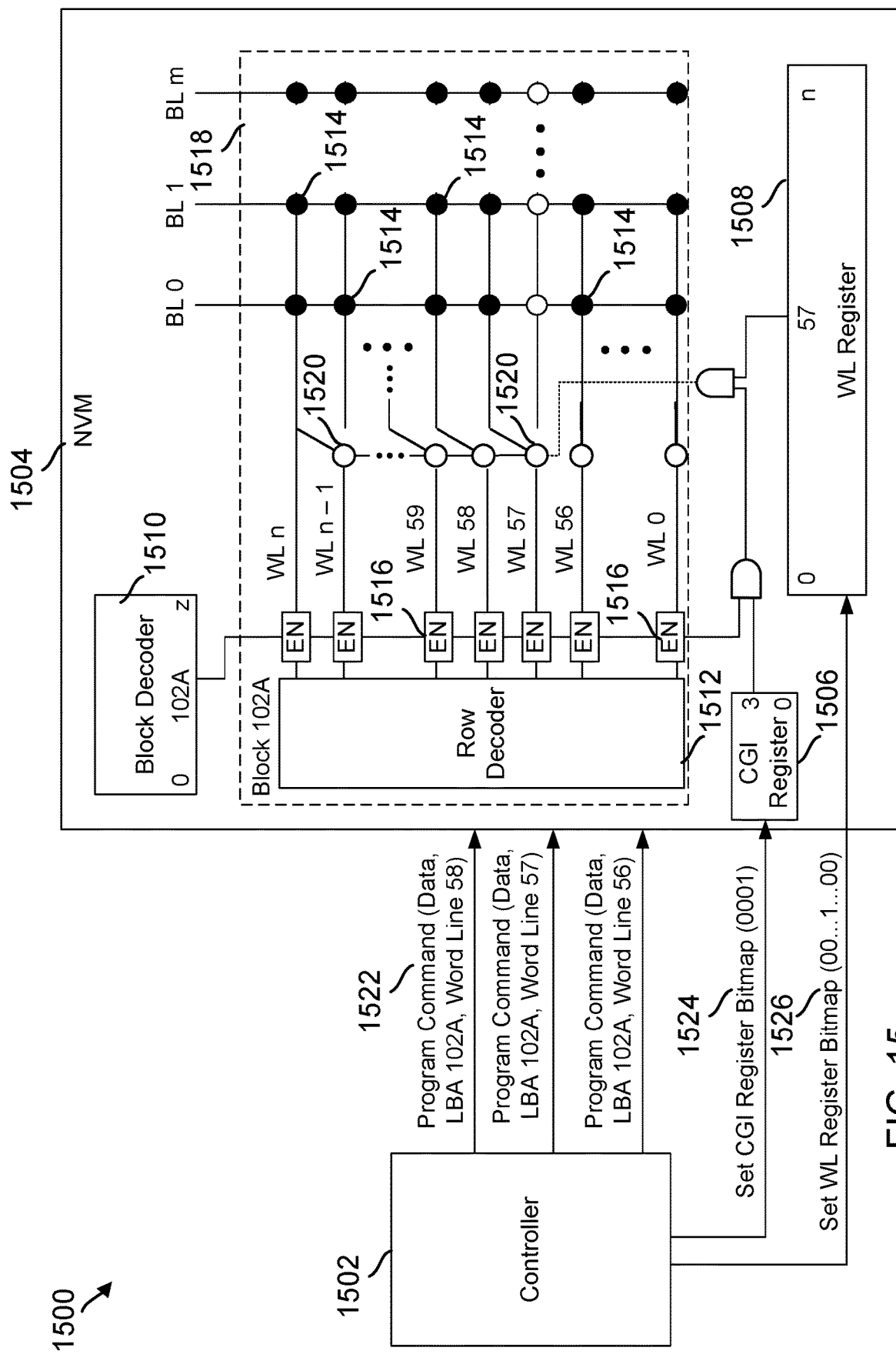
FIG. 15 is a conceptual diagram illustrating an example of a controller that performs program operations using a CGI register and a WL register in the storage device of FIG. 1.

FIG. 15 illustrates an example 1500 of a controller 1502 (e.g., controller 123, 1402) that performs program operations in NVM 1504 (e.g., NVM 110, 201, 1404) using a CGI register 1506 and a WL register 1508. CGI register 1506 may include circuitry or hardware (e.g., one or more latches, etc.) that is sized to store a number of bits equal in quantity to a number of CGI sets in the storage device 102, with each bit in the CGI register corresponding to a different CGI set. WL register 1508 may include circuitry or hardware (e.g., one or more latches, etc.) that is sized to store a number of bits equal in quantity to a number of word lines in a given block of the NVM 1504, with each bit in the WL register corresponding to a different word line. Moreover, a common WL register may apply for every block of an associated CGI set, since a given WL may be common to all of these blocks for the same CGI set. Thus, multiple of such WL registers 1508 may exist, including one respective WL register for each CGI set.

CGI register 1506 may include a bitmap corresponding to CGI sets. For example, if storage device 102 includes four CGI sets as previously described, the length of the CGI register 1506 may be four bits, with value 1000 indicating CGI-set-1, value 0100 indicating CGI-set-2, value 0010 indicating CGI-set-3, and value 0001 indicating CGI-set-4. Similarly, each of the multiple WL registers 1508 may include a bitmap corresponding to word lines of blocks associated with a corresponding CGI set. For example, if storage device 102 includes n WLs, the length of each of the WL registers 1508 (one for each CGI set) may be n bits, with value 10 . . . 00 indicating WL 0, value 01 . . . 00 indicating WL 1, value 00 . . . 10 indicating WL n−1, and value 00 . . . 01 indicating WL n.

Similar to NVM 1404 in FIG. 14, NVM 1504 may include a block decoder 1510 including circuitry or hardware (e.g., one or more multiplexers, transistors, etc.) configured to decode a logical block identifier or LBA received from controller 123, a row decoder 1512 including circuitry or hardware (e.g., one or more multiplexers, transistors, etc.) configured to decode a word line identifier or word line address received from controller 123, memory cells 1514 (e.g., SLCs, MLCs, etc.) coupled to word lines (WLs) and bit lines (BLs), and block enablers 1516 including circuitry or hardware (e.g., one or more switches, transistors, etc.) configured to electrically couple outputs of the row decoder 1512 to the memory cells 1514 in response to a block decoder output indicating a block 1518 for a current NAND operation (e.g., erase, read, program). NVM 1504 may also include other components than those illustrated (e.g., a column decoder coupled to the bit lines, sense amplifiers, latches, etc.).

Additionally, in this example, NVM 1504 may include word line enablers 1520 including circuitry or hardware (e.g., one or more switches, transistors, etc.) configured to prevent programming of respective word lines in response to values of the bitmaps output from the CGI register 1506 and WL register 1508. For instance, word line enablers 1520 may be configured to electrically couple respective word lines to subsequent word lines such as illustrated in FIG. 15 (e.g., WL n−1 to WL n), or in some other manner, such that the voltages on given word lines may be passed to other word lines in response to the values of these registers. Thus, in the illustrated example, in response to one bitmap value corresponding to CGI-set-4 in CGI register 1506 and another bitmap value corresponding to WL 57 in WL register 1508, the word line enabler 1520 coupled to WL 57 may be configured to pass voltages output from the row decoder on this word line to subsequent WL 58, the word line enabler 1520 coupled to WL 58 may be configured to pass voltages output from the row decoder on this word line to subsequent WL 59, and so forth as illustrated.

Similar to in the example of FIG. 14, here before encountering a program failure for a word line in a block (e.g., block 102A in the illustrated example), the controller may provide program commands 1522 including an LBA, word lines in the block associated with this LBA, and data to be programmed in the memory cells coupled to those word lines. In response to respective program commands including LBA 102A and a current word line for programming, the block decoder 1510 may activate the block enablers 1516 to allow a program voltage to be output from the row decoder 1512 over the current word line and pass through voltages to be output from the row decoder 1512 over the other word lines to the memory cells 1514. Likewise in this example, a short between WL 57 and a CGI in a CGI set associated with the block 1518 (e.g., CGI-set-4 in this example) may result in a program failure following an attempt to program data in the cells coupled to WL 57, and the controller may mark block 102A as a GBB. The controller may subsequently determine that the GBB is associated with a CGI-WL defect based, for example, on the mapping table 1100 and bad block table 1200 as previously described. Following this determination, the controller may identify WL 57 as a common word line(s) associated with a program failure in different blocks associated with CGI-set-4 (including block 1518, in this example with LBA 102A) based, for example, on the error log, error status, maximum loop count, and/or relative BER of WL 57.

After the controller identifies the common word line(s) associated with program failures, the controller 123 may provide a command 1524 to set CGI register 1506 with a bitmap value corresponding to the previously determined CGI set (e.g., CGI-set-4 in this example), and a command 1526 to set WL register 1508 with a bitmap value corresponding to the identified word line(s) (e.g., WL 57 in this example). For instance, following a determination that a program failure occurred in WL 57 in multiple ones of the blocks mapped to CGI-set-4, the controller may provide command 1524 including a CGI register bitmap value corresponding to CGI-set-4 (e.g., 0001) and command 1526 including a WL register bitmap value corresponding to WL 57 (e.g., 00 . . . 1 . . . 00), in response to which commands the CGI register 1506 may be updated with the set CGI register bitmap and the WL register 1508 may be updated with the set WL register bitmap respectively. The controller may also un-mark this block 1518 and other blocks associated with the same CGI set as GBBs.

Following re-allocation of these blocks to the population of available blocks (not GBBs), the controller 123 may again start to perform NAND operations in block 1518 while continuing to provide program commands 1522 including identified word lines with CGI-WL defects in the NVM 1504, since these word lines may not be programmed in response to the values of the set registers. For instance, in response to setting CGI register 1506 with the value 0001 (corresponding to CGI-set-4) and WL register 1508 with the value 00 . . . 1 . . . 00 (corresponding to WL 57) as illustrated in FIG. 15, as well as in response to the block decoder 1510 enabling programming of block 1516 (e.g., current block 102A), the WL enabler 1520 on WL 57 may be configured to pass a program voltage applied on WL 57 to the memory cells 1514 on WL 58, a pass through voltage applied on WL 58 to the memory cells 1514 on WL 59, and so forth until WL n. Thus, when the controller includes word line 57 in a program command 1522 to the NVM 1504 as illustrated in FIG. 15, this word line may be excluded from programming since subsequent WL 58 may be programmed instead in the NVM (e.g., the cells of WL 58 may store data intended for WL 57). Similarly, WL enablers 1520 and the registers 1506, 1508 may be configured such that program commands 1522 including word lines with greater logical identifiers (e.g., 58 or greater in this example) result in programming of subsequent word lines, while program commands 1522 including word lines with lesser logical identifiers (e.g., 56 or lesser in this example) result in programming of same word lines. For example, a program command for WL 58 may be changed to a program operation in WL 59, a program command for WL 59 may be changed to a program operation in WL 60, and so forth, while a program command for WL 56 may still result in a program operation in WL 56, a program command for WL 55 may still result in a program operation in WL 55, and so forth. In this way, the controller may continue to program data in other word lines of the block that do not include the CGI-WL defect without losing the entire block as a GBB, while also minimizing the likelihood of entering a read only mode from large quantities of GBBs.

It should be understood that while the aforementioned examples refer to CGIs, the aspects of the present disclosure may be extended to any global interconnect. For example, as bit cost scaling (BiCS) generations increase (e.g., to BiCS6 or 8) and chip under array (CUA)/chip beside array (CBA) architecture becomes prevalent, the amount of interfaces between global and local metal routings in 3D NAND arrays may increase (e.g., there may be many metal level routings between CUA/CBA and top metals over memory). Therefore, the controller may similarly apply the operations described with respect to FIG. 10 to word lines in blocks of other global interconnect sets (e.g., where the block numbers in a set may be different than in a CGI set, but the process used may still be the same).

Figure 16:
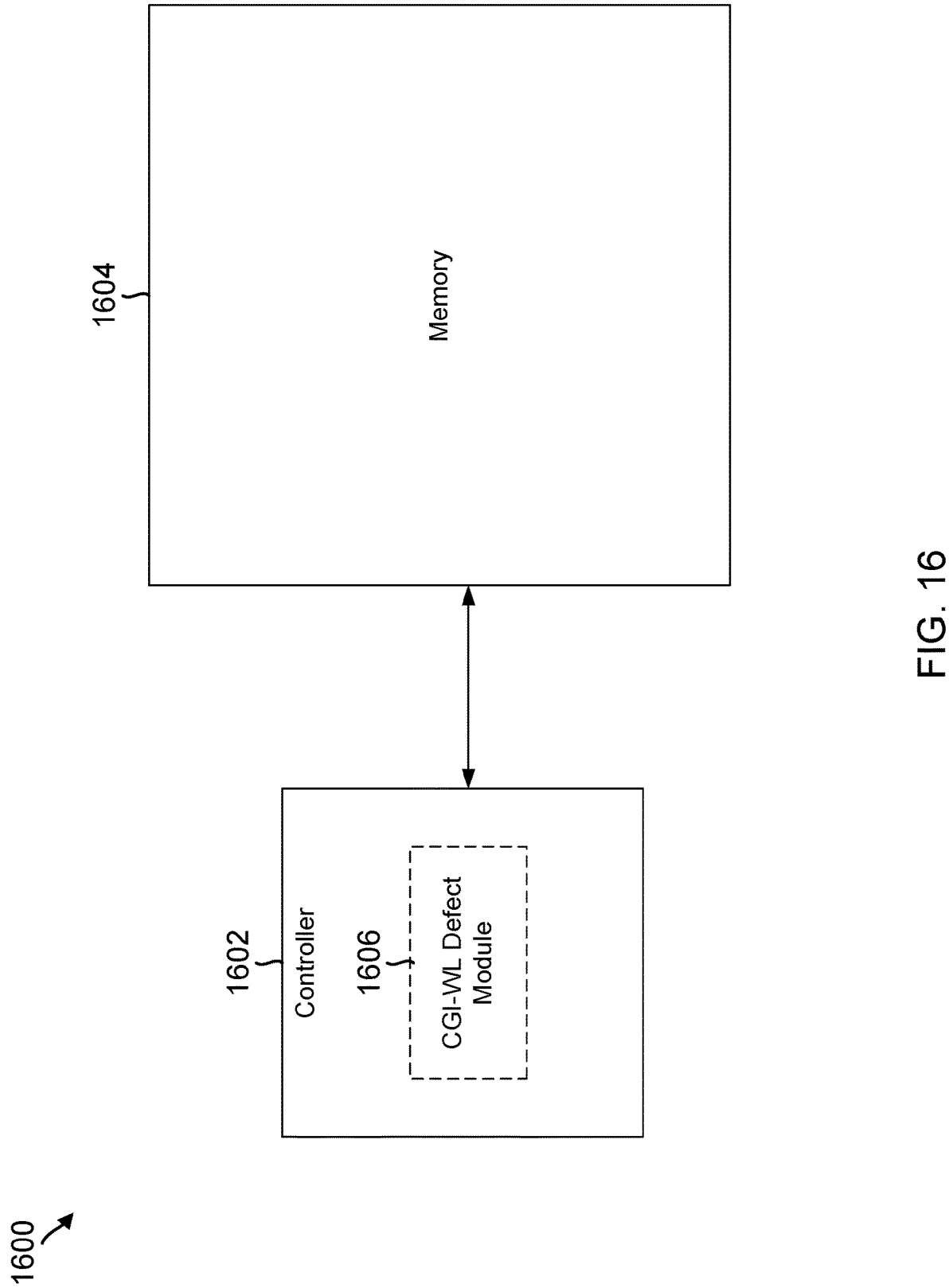
FIG. 16 is a conceptual diagram illustrating an example of a controller that handles grown bad blocks with CGI—WL defects in the storage device of FIG. 1.

FIG. 16 is a conceptual diagram illustrating an example 1600 of a controller 1602 coupled to a memory 1604 in a storage device. For example, controller 1602 may correspond to controller 123, 1402, 1502 and memory 1604 may correspond to the NVM 110, 201, 1404, 1504 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 1602 includes a CGI-WL defect module 1606 that may provide a means for determining a logical address pattern associated with multiple ones of blocks of non-volatile memory that respectively include a program failure, the blocks each including a plurality of word lines. For example, the CGI-WL defect module 1606 may perform the process described above with respect to FIG. 10. The means for determining is further configured to determine whether the logical address pattern is associated with an interconnect set including a plurality of interconnects between the multiple ones of the blocks. The means for determining is also configured to determine, in response to the logical address pattern being associated with the interconnect set, a word line from the plurality of word lines that is associated with the program failures, where the word line is a common word line associated with the program failures in the multiple ones of the blocks. The CGI-WL defect module 1606 may further provide a means for refraining from programming the common word line during respective program operations in the multiple ones of the blocks.

Implementation examples are described in the following numbered clauses:

Clause 1. A storage device, comprising: a plurality of blocks (e.g., blocks 502, 602, 802) of non-volatile memory (e.g., NVM 110, 201, 1404, 1504), each block including a plurality of word lines (e.g., word lines 304, 404, 508, 808); a plurality of interconnects (e.g., CGIs 606, 806) between multiple ones of the blocks (e.g., blocks 602, 810, 812), the plurality of interconnects being within an interconnect set (e.g., CGI set 1102); volatile memory (e.g., volatile memory 117, 118, 1408); and a controller (e.g., controller 123, 1402, 1502) configured to: determine a word line from the plurality of word lines that is associated with a program failure (e.g., at block 1014), the word line being a common word line associated with program failures in the multiple ones of the blocks (e.g., WL 57 results in program failures in blocks 810, 812), store, in the volatile memory (e.g., in isolation table 1406 at block 1016 and 1018), a logical identifier of the common word line (e.g., word line address 57) and logical addresses of the multiple ones of the blocks (e.g., block addresses 1104) in response to the determination, and program multiple word lines of the plurality of word lines respectively in the blocks associated with the logical addresses (e.g., program data in memory cells coupled to WLs 56, 58, etc. blocks 102A, 102C, 202A, etc. indicated in program commands 1420), the multiple word lines excluding at least the word line associated with the stored logical identifier (e.g., WL 57 is excluded from program commands 1420).

Clause 2. The storage device of clause 1, wherein the controller is further configured to: determine whether a quantity of the multiple ones of the blocks exceeds a threshold (e.g., at block 1006), and determine the word line associated with the program failure (e.g., at block 1014) in response to the quantity exceeding the threshold.

Clause 3. The storage device of clause 1 or clause 2, wherein the controller is further configured to: determine, in response to a quantity of the multiple ones of the blocks exceeding a threshold (e.g., at block 1006), whether the program failures are associated with the interconnect set for the multiple ones of the blocks (e.g., at block 1012), and determine the common word line associated with the program failures (e.g., at block 1014) in response to the program failures being associated with the interconnect set.

Clause 4. The storage device of any of clauses 1 to 3, wherein the controller is further configured to: determine a logical address pattern associated with the multiple ones of the blocks (e.g., at block 1012, such as a pattern of logical addresses ending in 'A' and 'C' for bad blocks in bad block table 1200), the multiple ones of the blocks respectively including a program failure, and determine the common word line associated with the program failures (e.g., at block 1014) in response to the logical address pattern being within a plurality of logical addresses (e.g., block addresses 1104) associated with the interconnect set (e.g., CGI set 1102) for the multiple ones of the blocks (such as in response to the pattern of logical addresses ending in 'A' and 'C' for bad blocks being within LBAs 102A, 102C, 202A, etc. being associated with CGI-set-4).

Clause 5. The storage device of any of clauses 1 to 4, wherein the controller is further configured to: determine whether a block error rate (BER) associated with the common word line (e.g., the BER of WL 57 in chart 1310) is a greater BER than the BERs respectively associated with other word lines of the plurality of word lines, and store, in the volatile memory (e.g., in isolation table 1406), the logical identifier of the common word line and the logical addresses of the multiple ones of the blocks in response to the BER being the greater BER.

Clause 6. The storage device of any of clauses 1 to 5, wherein the controller is further configured to: add the multiple ones of the blocks to a pool of grown bad blocks (GBBs) (e.g., at block 1004) in response to respective program failures including the program failure (e.g., determined at block 1002), and remove the multiple ones of the blocks from the pool of GBBs (e.g., at block 1022) in response to a determination that the respective program failures are associated with the interconnect set (e.g., at block 1012).

Clause 7. The storage device of any of clauses 1 to 6, wherein the controller is further configured to: refrain from programming multiple ones of the word lines commonly associated with program failures in the multiple ones of the blocks (e.g., WL 57 in the example of FIG. 14) in response to logical identifiers of the word lines and the logical addresses of the multiple ones of the blocks being stored in a table in the volatile memory (e.g., the isolation table 1406).

Clause 8. The storage device of any of clauses 1 to 7, wherein the controller is further configured to: refrain from including the logical identifier of the word line stored in the volatile memory in a command to program the multiple word lines respectively in at least one of the multiple ones of the blocks (e.g., WL 57 is excluded from program commands 1420).

Clause 9. A storage device, comprising: a plurality of blocks of non-volatile memory, each block including a plurality of word lines; a plurality of interconnects between multiple ones of the blocks, the plurality of interconnects being within an interconnect set; and a controller configured to: determine a logical address pattern associated with the multiple ones of the blocks (e.g., at block 1012 from bad block table 1200), the multiple ones of the blocks respectively including a program failure, determine whether the logical address pattern is associated with the interconnect set for the multiple ones of the blocks (e.g., at block 1012 from mapping table 1100), determine, in response to the logical address pattern being associated with the interconnect set, a word line from the plurality of word lines that is associated with the program failures (e.g., at block 1014), the word line being a common word line associated with the program failures in the multiple ones of the blocks, and refrain from programming the common word line during respective program operations in the multiple ones of the blocks (such as in the examples of FIGS. 14 and 15).

Clause 10. The storage device of clause 9, wherein the controller is further configured to: determine whether a quantity of the multiple ones of the blocks exceeds a threshold, and determine the common word line associated with the program failures in response to the quantity exceeding the threshold.

Clause 11. The storage device of clause 9 or clause 10, wherein the controller is further configured to: determine whether the logical address pattern is associated with the interconnect set for the multiple ones of the blocks in response to a quantity of the multiple ones of the blocks exceeding a threshold.

Clause 12. The storage device of any of clauses 9 to 11, wherein the storage device further comprises: volatile memory; and the controller is further configured to: store, in the volatile memory, an identifier of the common word line and logical addresses of the multiple ones of the blocks in response to determining the common word line associated with the program failures.

Clause 13. The storage device of any of clauses 9 to 12, wherein the controller is further configured to: add the multiple ones of the blocks to a pool of grown bad blocks (GBBs) respectively in response to the program failures, and remove the multiple ones of the blocks from the pool of GBBs in response to determining the common word line associated with the program failures.

Clause 14. The storage device of any of clauses 9 to 13, wherein the storage device further comprises: volatile memory; and the controller is further configured to: refrain from programming the common word line in response to a logical identifier of the word line and logical addresses of the multiple ones of the blocks being stored in a table in the volatile memory.

Clause 15. The storage device of any of clauses 9 to 14, wherein the storage device further comprises: a first register including a first set of bits corresponding to the plurality of interconnects; a second register including a second set of bits corresponding to the plurality of word lines; and the controller is further configured to: refrain from programming the common word line in response to a value of the first register and a value of the second register.

Clause 16. The storage device of any of clauses 9 to 15, wherein the storage device further comprises: a first register including a first set of bits corresponding to the plurality of interconnects; a second register including a second set of bits corresponding to the plurality of word lines; and the controller is further configured to: provide a command to program the plurality of word lines respectively in at least one of the multiple ones of the blocks, the command including a logical identifier of the common word line, wherein the common word line is not programmed in response to a value of the first register and a value of the second register.

Clause 17. The storage device of any of clauses 9 to 16, wherein the storage device further comprises: a first register including a first set of bits corresponding to the plurality of interconnects; a second register including a second set of bits corresponding to the plurality of word lines; and to refrain from programming the common word line during one of the respective program operations, the controller is further configured to: update a first bit corresponding to the interconnect set in the first set of bits, and update a second bit corresponding to the common word line in the second set of bits, wherein the common word line is not programmed in response to a value of the first bit and a value of the second bit.

Clause 18. A storage device, comprising: a plurality of blocks of non-volatile memory, each block including a plurality of word lines; a plurality of interconnects between multiple ones of the blocks, the plurality of interconnects being within an interconnect set; a first register (e.g., CGI register 1506) including a first set of bits corresponding to the plurality of interconnects; a second register (e.g., WL register 1508) including a second set of bits corresponding to the plurality of word lines; and a controller configured to: determine the interconnect set associated with program failures in the multiple ones of the blocks (e.g., at block 1012), determine, in response to the determination of the interconnect set, a word line from the plurality of word lines that is associated with the program failures (e.g., at block 1014), the word line being a common word line to the multiple ones of the blocks, and provide a command to program the plurality of word lines respectively in at least one of the multiple ones of the blocks (e.g., in program commands 1522), the common word line being excluded from programming in response to a value of the first register and a value of the second register.

Clause 19. The storage device of clause 18, wherein the controller is further configured to: determine whether a quantity of the multiple ones of the blocks exceeds a threshold, and determine the interconnect set associated with the program failures in response to the quantity exceeding the threshold.

Clause 20. The storage device of clause 18 or clause 19, wherein the controller is further configured to: add the multiple ones of the blocks to a pool of grown bad blocks (GBBs) respectively in response to the program failures, determine whether a quantity of the GBBs exceeds a threshold, and remove the multiple ones of the blocks from the pool of GBBs in response to determining the quantity of the GBBs exceeds the threshold, the interconnect set associated with the program failures, and the common word line associated with the program failures.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to all types of storage devices capable of storing data. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for.

What is claimed is:

1. A storage device, comprising:
    a plurality of blocks of non-volatile memory, each block including a plurality of word lines;
    a plurality of interconnects between multiple ones of the blocks, the plurality of interconnects being within an interconnect set;
    volatile memory; and
    a controller configured to:
        determine a word line from the plurality of word lines that is associated with a program failure, the word line being a common word line associated with program failures in the multiple ones of the blocks,
        store, in the volatile memory, a logical identifier of the common word line and logical addresses of the multiple ones of the blocks in response to the determination, and
        program multiple word lines of the plurality of word lines respectively in the blocks associated with the logical addresses, the multiple word lines excluding at least the word line associated with the stored logical identifier.

2. The storage device of claim 1, wherein the controller is further configured to:
    determine whether a quantity of the multiple ones of the blocks exceeds a threshold, and
    determine the word line associated with the program failure in response to the quantity exceeding the threshold.

3. The storage device of claim 1, wherein the controller is further configured to:
    determine, in response to a quantity of the multiple ones of the blocks exceeding a threshold, whether the program failures are associated with the interconnect set for the multiple ones of the blocks, and
    determine the common word line associated with the program failures in response to the program failures being associated with the interconnect set.

4. The storage device of claim 1, wherein the controller is further configured to:
    determine a logical address pattern associated with the multiple ones of the blocks, the multiple ones of the blocks respectively including a program failure, and
    determine the common word line associated with the program failures in response to the logical address pattern being within a plurality of logical addresses associated with the interconnect set for the multiple ones of the blocks.

5. The storage device of claim 1, wherein the controller is further configured to:
    determine whether a block error rate (BER) associated with the common word line is a greater BER than the BERs respectively associated with other word lines of the plurality of word lines, and
    store, in the volatile memory, the logical identifier of the common word line and the logical addresses of the multiple ones of the blocks in response to the BER being the greater BER.

6. The storage device of claim 1, wherein the controller is further configured to:
    add the multiple ones of the blocks to a pool of grown bad blocks (GBBs) in response to respective program failures including the program failure, and
    remove the multiple ones of the blocks from the pool of GBBs in response to a determination that the respective program failures are associated with the interconnect set.

7. The storage device of claim 1, wherein the controller is further configured to:
    refrain from programming multiple ones of the word lines commonly associated with program failures in the multiple ones of the blocks in response to logical identifiers of the word lines and the logical addresses of the multiple ones of the blocks being stored in a table in the volatile memory.

8. The storage device of claim 1, wherein the controller is further configured to:
refrain from including the logical identifier of the word line stored in the volatile memory in a command to program the multiple word lines respectively in at least one of the multiple ones of the blocks.

9. A storage device, comprising:
a plurality of blocks of non-volatile memory, each block including a plurality of word lines;
a plurality of interconnects between multiple ones of the blocks, the plurality of interconnects being within an interconnect set; and
a controller configured to:
determine a logical address pattern associated with the multiple ones of the blocks, the multiple ones of the blocks respectively including a program failure,
determine whether the logical address pattern is associated with the interconnect set for the multiple ones of the blocks,
determine, in response to the logical address pattern being associated with the interconnect set, a word line from the plurality of word lines that is associated with the program failures, the word line being a common word line associated with the program failures in the multiple ones of the blocks, and
refrain from programming the common word line during respective program operations in the multiple ones of the blocks.

10. The storage device of claim 9, wherein the controller is further configured to:
determine whether a quantity of the multiple ones of the blocks exceeds a threshold, and
determine the common word line associated with the program failures in response to the quantity exceeding the threshold.

11. The storage device of claim 9, wherein the controller is further configured to:
determine whether the logical address pattern is associated with the interconnect set for the multiple ones of the blocks in response to a quantity of the multiple ones of the blocks exceeding a threshold.

12. The storage device of claim 9, wherein the storage device further comprises:
volatile memory; and
the controller is further configured to:
store, in the volatile memory, an identifier of the common word line and logical addresses of the multiple ones of the blocks in response to determining the common word line associated with the program failures.

13. The storage device of claim 9, wherein the controller is further configured to:
add the multiple ones of the blocks to a pool of grown bad blocks (GBBs) respectively in response to the program failures, and
remove the multiple ones of the blocks from the pool of GBBs in response to determining the common word line associated with the program failures.

14. The storage device of claim 9, wherein the storage device further comprises:
volatile memory; and
the controller is further configured to:
refrain from programming the common word line in response to a logical identifier of the word line and logical addresses of the multiple ones of the blocks being stored in a table in the volatile memory.

15. The storage device of claim 9, wherein the storage device further comprises:
a first register including a first set of bits corresponding to the plurality of interconnects;
a second register including a second set of bits corresponding to the plurality of word lines; and
the controller is further configured to:
refrain from programming the common word line in response to a value of the first register and a value of the second register.

16. The storage device of claim 9, wherein the storage device further comprises:
a first register including a first set of bits corresponding to the plurality of interconnects;
a second register including a second set of bits corresponding to the plurality of word lines; and
the controller is further configured to:
provide a command to program the plurality of word lines respectively in at least one of the multiple ones of the blocks, the command including a logical identifier of the common word line, wherein the common word line is not programmed in response to a value of the first register and a value of the second register.

17. The storage device of claim 9, wherein the storage device further comprises:
a first register including a first set of bits corresponding to the plurality of interconnects;
a second register including a second set of bits corresponding to the plurality of word lines; and
to refrain from programming the common word line during one of the respective program operations, the controller is further configured to:
update a first bit corresponding to the interconnect set in the first set of bits, and
update a second bit corresponding to the common word line in the second set of bits,
wherein the common word line is not programmed in response to a value of the first bit and a value of the second bit.

18. A storage device, comprising:
a plurality of blocks of non-volatile memory, each block including a plurality of word lines;
a plurality of interconnects between multiple ones of the blocks, the plurality of interconnects being within an interconnect set;
a first register including a first set of bits corresponding to the plurality of interconnects;
a second register including a second set of bits corresponding to the plurality of word lines; and
a controller configured to:
determine the interconnect set associated with program failures in the multiple ones of the blocks,
determine, in response to the determination of the interconnect set, a word line from the plurality of word lines that is associated with the program failures, the word line being a common word line to the multiple ones of the blocks, and provide a command to program the plurality of word lines respectively in at least one of the multiple ones of the blocks, the common word line being excluded from programming in response to a value of the first register and a value of the second register.

19. The storage device of claim 18, wherein the controller is further configured to:
   determine whether a quantity of the multiple ones of the blocks exceeds a threshold, and
   determine the interconnect set associated with the program failures in response to the quantity exceeding the threshold.

20. The storage device of claim 18, wherein the controller is further configured to:
   add the multiple ones of the blocks to a pool of grown bad blocks (GBBs) respectively in response to the program failures,
   determine whether a quantity of the GBBs exceeds a threshold, and
   remove the multiple ones of the blocks from the pool of GBBs in response to determining the quantity of the GBBs exceeds the threshold, the interconnect set associated with the program failures, and the common word line associated with the program failures.

* * * * *